United States Patent
Xu et al.

(10) Patent No.: US 11,750,523 B2
(45) Date of Patent: Sep. 5, 2023

(54) METHOD AND APPARATUS FOR TRAFFIC DETECTION

(71) Applicant: Telefonaktiebolaget LM Ericsson (publ), Stockholm (SE)

(72) Inventors: Wenliang Xu, Shanghai (CN); Miguel Angel Muñoz De La Torre Alonso, Madrid (ES); Antonio Cañete Martinez, Madrid (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 114 days.

(21) Appl. No.: 17/430,464

(22) PCT Filed: Jul. 9, 2019

(86) PCT No.: PCT/CN2019/095314
§ 371 (c)(1),
(2) Date: Aug. 12, 2021

(87) PCT Pub. No.: WO2020/164226
PCT Pub. Date: Aug. 20, 2020

(65) Prior Publication Data
US 2022/0224650 A1 Jul. 14, 2022

Related U.S. Application Data

(63) Continuation-in-part of application No. PCT/CN2019/075223, filed on Feb. 15, 2019.

(51) Int. Cl.
*H04L 47/2483* (2022.01)
*H04L 43/0894* (2022.01)

(52) U.S. Cl.
CPC ...... *H04L 47/2483* (2013.01); *H04L 43/0894* (2013.01)

(58) Field of Classification Search
CPC .............. H04L 43/0894; H04L 47/2483
See application file for complete search history.

(56) References Cited

U.S. PATENT DOCUMENTS 10,848,974 B2 * 11/2020 Bachmutsky ......... H04W 76/10
10,932,095 B2 * 2/2021 Dao ..................... H04L 67/147
(Continued)

FOREIGN PATENT DOCUMENTS

CN  108064032 A  5/2018
WO  2018064826 A1  4/2018
(Continued)

OTHER PUBLICATIONS

European Extended Search Report dated Feb. 23, 2022 for Application No. 19914845.3, consisting of 10 pages.
(Continued)

*Primary Examiner* — George C Neurauter, Jr.
(74) *Attorney, Agent, or Firm* — Christopher & Weisberg, P.A.

(57) ABSTRACT

Various embodiments of the present disclosure provide a method for traffic detection. The method which may be performed by a first network node includes receiving a message from a second network node. The method further includes determining packet flow description information for traffic detection according to the message. The packet flow description information may indicate a combination criterion for two or more packet flow descriptions, and/or a protocol matching criterion for a domain name in a packet flow description. According to the embodiments of the present disclosure, the packet flow description definition can be extended to support more accurate traffic detection.

24 Claims, 11 Drawing Sheets

400

┌─────────────────────────────────────────┐
│ Receive a message from a second network node │ 402
└─────────────────────────────────────────┘
                    │
┌─────────────────────────────────────────┐
│ Determine PFD information for traffic detection │ 404
│        according to the message          │
└─────────────────────────────────────────┘

(56) References Cited

U.S. PATENT DOCUMENTS

| | | | |
|---|---|---|---|
| 10,972,575 B2* | 4/2021 | Li | H04W 8/08 |
| 2021/0153019 A1* | 5/2021 | Bachmutsky | H04W 28/02 |

FOREIGN PATENT DOCUMENTS

| | | |
|---|---|---|
| WO | 2018082707 A1 | 5/2018 |
| WO | 2018145669 A1 | 8/2018 |

OTHER PUBLICATIONS

3GPP TS 23.503 Draft V15.4.0+; 3rd Generation Partnership Project; Technical Specification Group Services and System Aspects; Policy and Charging Control Framework for the 5G System; Stage 2 (Release 15); Feb. 2019, consisting of 77 pages.
3GPP TSG-SA2 Meeting #116 S2-163329; Change Request; 23.203 CR 1036 rev-Current version: 14.0.0; Management of PFDs to PCEF/TDF; Location and Date: Vienna, Austria, Jul. 11-15, 2016, consisting of 9 pages.
3GPP TSG-SA2 WG2 Meeting #127-Bis S2-185537; Change Request; 23.203 CR 0067 rev 1 Current version: 15.1.0 Protocol criteria for domain name matching; Location and Date: Newport Beach, CA, USA, May 28-Jun. 1, 2018, consisting of 3 pages.
International Preliminary Report on Patentability dated May 19, 2021 for International Application No. PCT/CN2019/095314 filed Jul. 9, 2019, consisting of 6-pages.
Indian Office Action dated Apr. 8, 2022 for Patent Application No. 202147040871, consisting of 5-pages.
International Search report and Written Opinion dated Oct. 30, 2019 for International Application No. PCT/CN2019/095314 filed Jul. 9, 2019, consisting of 6-pages.
3GPP TSG-SA2 Meeting #116-BIS S2-165042 (revision of S2-164731); Title: Provisioning PFD via SCEF; Source to WG: China Mobile, Huawei; Source to TSG: SA2; Work Item Code: SDCI; Date and Location: Aug. 28-Sep. 2, 2016, Sanya, China, consisting of 3-pages.
3GPP TS 23.502 V15.4.1; 3rd Generation Partnership Project; Technical Specification Group Services and System Aspects; Procedures for the 5G System; Stage 2 (Release 15), Jan. 2019, consisting of 347-pages.
3GPP TS 23.503 V15.4.0; 3rd Generation Partnership Project; Technical Specification Group Services and System Aspects; Policy and Charging Control Framework for the 5G System; Stage 2 (Release 15), Dec. 2018, consisting of 76-pages.
3GPP TS 23.682 V16.1.0; 3rd Generation Partnership Project; Technical Specification Group Services and System Aspects; Architecture enhancement to facilitate communications with packet data networks and applications (Release 16), Dec. 2018, consisting of 126-pages.
3GPP TS 29.122 V15.2 0; 3rd Generation Partnership Project; Technical Specification Group Core Network and Terminals; T8 reference point for Northbound APIs; (Release 15), Dec. 2018, consisting of 297-pages.
3GPP TS 29.250 V15.0.0; 3rd Generation Partnership Project; Technical Specification Group Core Network and Terminals; Nu reference point between SCEF and PFDF for sponsored data connectivity (Release 15), Jun. 2018, consisting of 20-pages.
3GPP TS 29.251 V15.1.0; 3rd Generation Partnership Project; Technical Specification Group Core Network and Terminals; Gw and Gwn reference point for sponsored data connectivity (Release 15), Dec. 2018, consisting of 35-pages.
3GPP TS 29.519 V15.2.0; 3rd Generation Partnership Project; Technical Specification Group Core Network and Terminals; 5G System; Usage of the Unified Data Repository service for Policy Data, Application Data and Structured Data for exposure; Stage 3 (Release 15), Dec. 2018, consisting of 99-pages.
3GPP TS 29.551 V15.2.0; 3rd Generation Partnership Project; Technical Specification Group Core Network and Terminals; 5G System; Packet Flow Description Management Service; Stage 3 (Release 15), Dec. 2018, consisting of 27-pages.
c3GPP TS 23.682 V16.1.0; 3rd Generation Partnership Project; Technical Specification Group Services and System Aspects; Architecture enhancement to facilitate communications with packet data networks and applications (Release 16), Dec. 2018, consisting of 126-pages.

* cited by examiner

METHOD AND APPARATUS FOR TRAFFIC DETECTION

CROSS-REFERENCE TO RELATED APPLICATIONS

This application is a Submission Under 35 U.S.C. § 371 for U.S. National Stage Patent Application of International Application No.: PCT/CN2019/095314, filed Jul. 9, 2019 entitled "METHOD AND APPARATUS FOR TRAFFIC DETECTION," which claims priority to International Application No.: PCT/CN2019/075223, filed Feb. 15, 2019, the entireties of both of which are incorporated herein by reference.

FIELD OF THE INVENTION

The present disclosure generally relates to communication networks, and more specifically, to traffic detection in a communication network.

BACKGROUND

This section introduces aspects that may facilitate a better understanding of the disclosure. Accordingly, the statements of this section are to be read in this light and are not to be understood as admissions about what is in the prior art or what is not in the prior art.

Communication service providers and network operators have been continually facing challenges to deliver value and convenience to consumers by, for example, providing compelling network services and performance. With the rapid development of networking and communication technologies, wireless communication networks such as long-term evolution (LTE)/fourth generation (4G) network and new radio (NR)/fifth generation (5G) network are expected to achieve high traffic capacity and end-user data rate with lower latency. To meet the diverse requirements of new services across a wide variety of industries, the 3rd generation partnership project (3GPP) is developing a core network architecture such as evolved packet core (EPC) or 5G core (5GC), which is supposed to support the wide range of performance requirements demanded by new business opportunities, multiple access technologies, a variety of services and new device types. By accessing a particular application using a network protocol, customers can obtain specific services provided by an application service provider (ASP) over a communication network. Detection of application traffics provided by a 3rd party service provider enables delivery of service data and enforcement of network policies. Thus, it is desirable to achieve accurate traffic detection in an efficient way.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

In order to detect application traffic or service data flow, a set of information such as a packet flow description (PFD) may be defined for an application by an ASP. The PFDs provided by the ASP may be used as part of application detection filters in a policy and charging enforcement function/traffic detection function (PCEF/TDF) to detect traffics generated by the application. However, some traffic may not be detected accurately because the current PFD does not indicate clearly which protocol (e.g., domain name system (DNS), transport layer security (TLS), etc.) is applicable for a domain name in the PFD. The improper traffic handling may potentially block application traffic and break the corresponding data use case. On the other hand, the existence of only one of a uniform resource locator (URL), an Internet protocol (IP) address and a domain name in the current PFD is not beneficial to discovery of fraud requests. Therefore, it may be desirable to improve accuracy of PFD based traffic detection.

Various embodiments of the present disclosure propose a solution of traffic detection in a communication network, which can allow PFD extension to support more accurate PFD matching in domain name and/or to support multiple PFD matching criteria, so that application traffic can be detected more accurately and be handled with more efficiency.

According to a first aspect of the present disclosure, there is provided a method performed by a first network node which may comprise a network node with a packet flow description function (PFDF). The method comprises receiving a message from a second network node (e.g., a service capability server (SCS), an application server (AS), an application function (AF), etc.). The method further comprises determining PFD information for traffic detection according to the message. The PFD information may indicate at least one of: a combination criterion for two or more PFDs, and a protocol matching criterion for a domain name in a PFD.

In accordance with an exemplary embodiment, the combination criterion for the two or more PFDs may indicate that the two or more PFDs are used together for the traffic detection. For example, a logical AND operation on the two or more PFDs in the traffic detection may be indicated in the combination criterion for the two or more PFDs.

In accordance with an exemplary embodiment, the protocol matching criterion for the domain name may indicate one or more protocols applicable for the domain name. The one or more protocols may comprise at least one of a DNS protocol and a TLS protocol.

In accordance with an exemplary embodiment, the protocol matching criterion for the domain name may indicate one or more protocol parameters to identify or indicate at least one of: a query name in a protocol message, a server name in a protocol message, a subject alternative name in a protocol message, and a subject common name in a protocol message.

In accordance with an exemplary embodiment, the message from the second network node may comprise a PFD management request. Optionally, the message from the second network node may be received by the first network node directly.

In accordance with an exemplary embodiment, the message from the second network node may be received by the first network node via an intermediate network node with a service capability exposure function (SCEF).

In accordance with an exemplary embodiment, the method according to the first aspect of the present disclosure may further comprise: receiving a first request for PFD information from a third network node (e.g., a PCEF, a TDF, a session management function (SMF), etc.), and transmitting a response to the first request to the third network node. The response may indicate the PFD information which is determined by the first network node according to the message from the second network node.

In accordance with an exemplary embodiment, the method according to the first aspect of the present disclosure may further comprise: notifying a third network node (e.g., a PCEF, a TDF, a session management function (SMF), etc.) of the PFD information.

In accordance with an exemplary embodiment, the method according to the first aspect of the present disclosure may further comprise: updating information in a database (e.g., a user data repository (UDR), etc.) by using the PFD information.

In accordance with an exemplary embodiment, the method according to the first aspect of the present disclosure may further comprise: receiving a second request for PFD information from a third network node, querying a database for the requested PFD information, obtaining the requested PFD information from the database, and transmitting a response to the second request to the third network node. The response may indicate the PFD information obtained from the database.

According to a second aspect of the present disclosure, there is provided an apparatus which may be implemented as a PFDF or a network exposure function (NEF) with PFDF. The apparatus may comprise one or more processors and one or more memories comprising computer program codes. The one or more memories and the computer program codes may be configured to, with the one or more processors, cause the apparatus at least to perform any step of the method according to the first aspect of the present disclosure.

According to a third aspect of the present disclosure, there is provided a computer-readable medium having computer program codes embodied thereon which, when executed on a computer, cause the computer to perform any step of the method according to the first aspect of the present disclosure.

According to a fourth aspect of the present disclosure, there is provided an apparatus which may be implemented as a PFDF or a NEF (PFDF). The apparatus comprises a receiving unit and a determining unit. In accordance with some exemplary embodiments, the receiving unit may be operable to carry out at least the receiving step of the method according to the first aspect of the present disclosure. The determining unit may be operable to carry out at least the determining step of the method according to the first aspect of the present disclosure.

According to a fifth aspect of the present disclosure, there is provided a method performed by a second network node which may comprise a SCS, an AS, a network node with an AF, etc. The method comprises determining PFD information for traffic detection. The PFD information may indicate a combination criterion for two or more PFDs, a protocol matching criterion for a domain name in a PFD, and/or any other content applicable for the traffic detection. The method further comprises transmitting the PFD information to a first network node (e.g., a PFDF, a NEF (PFDF), etc.).

In accordance with an exemplary embodiment, the PFD information for the traffic detection may be transmitted in a PFD management request by the second network node.

In accordance with an exemplary embodiment, the PFD information for the traffic detection may be transmitted to the first network node via an intermediate network node with a SCEF.

According to a sixth aspect of the present disclosure, there is provided an apparatus which may be implemented as a SCS, an AS, an AF, etc. The apparatus may comprise one or more processors and one or more memories comprising computer program codes. The one or more memories and the computer program codes may be configured to, with the one or more processors, cause the apparatus at least to perform any step of the method according to the fifth aspect of the present disclosure.

According to a seventh aspect of the present disclosure, there is provided a computer-readable medium having computer program codes embodied thereon which, when executed on a computer, cause the computer to perform any step of the method according to the fifth aspect of the present disclosure.

According to an eighth aspect of the present disclosure, there is provided an apparatus which may be implemented as a SCS, an AS, an AF, etc. The apparatus may comprise a determining unit and a transmitting unit. In accordance with some exemplary embodiments, the determining unit may be operable to carry out at least the determining step of the method according to the fifth aspect of the present disclosure. The transmitting unit may be operable to carry out at least the transmitting step of the method according to the fifth aspect of the present disclosure.

According to a ninth aspect of the present disclosure, there is provided a method performed by a third network node which may comprise a network node with a PCEF, a TDF, a SMF and/or any other proper session function. The method comprises receiving a message from a first network node (e.g., a PFDF, a NEF (PFDF), etc.). The method further comprises obtaining PFD information for traffic detection from the message. As described previously, the PFD information may indicate at least one of: a combination criterion for two or more PFDs, and a protocol matching criterion for a domain name in a PFD.

In accordance with an exemplary embodiment, the message received from the first network node may comprise a PFD provisioning notification and/or a PFD management notify request.

In accordance with an exemplary embodiment, the message received from the first network node may comprise a response to a fetch PFD request and/or a PFD management fetch request from the third network node.

According to a tenth aspect of the present disclosure, there is provided an apparatus which may be implemented as a PCEF, a TDF, a SMF, etc. The apparatus may comprise one or more processors and one or more memories comprising computer program codes. The one or more memories and the computer program codes may be configured to, with the one or more processors, cause the apparatus at least to perform any step of the method according to the ninth aspect of the present disclosure.

According to an eleventh aspect of the present disclosure, there is provided a computer-readable medium having computer program codes embodied thereon which, when executed on a computer, cause the computer to perform any step of the method according to the ninth aspect of the present disclosure.

According to a twelfth aspect of the present disclosure, there is provided an apparatus which may be implemented as a PCEF, a TDF, a SMF, etc. The apparatus may comprise a receiving unit and an obtaining unit. In accordance with some exemplary embodiments, the receiving unit may be operable to carry out at least the receiving step of the method according to the ninth aspect of the present disclosure. The obtaining unit may be operable to carry out at least the obtaining step of the method according to the ninth aspect of the present disclosure.

According to a thirteenth aspect of the present disclosure, there is provided a method performed by a database which may comprise a UDR. The method comprises receiving PFD information for traffic detection from a first network node (e.g., a PFDF, a NEF (PFDF), etc.). The method further comprises performing PFD handling based at least in part on the PFD information. As described previously, the PFD information may indicate at least one of: a combination criterion for two or more PFDs, and a protocol matching criterion for a domain name in a PFD.

In accordance with an exemplary embodiment, the PFD information may be received in at least one of a data management (DM) create request and a DM update request from the first network node.

In accordance with an exemplary embodiment, the method according to the thirteenth aspect of the present disclosure may further comprise: receiving a request for the PFD information from a fourth network node (e.g., a PFDF, a NEF (PFDF), etc.), and transmitting a response to the request to the fourth network node. The response may indicate the PFD information.

In accordance with an exemplary embodiment, the request for the PFD information may comprise a DM query request from the fourth network node. Optionally, the fourth network node may be different from the first network node.

According to a fourteenth aspect of the present disclosure, there is provided an apparatus which may be implemented as a UDR. The apparatus may comprise one or more processors and one or more memories comprising computer program codes. The one or more memories and the computer program codes may be configured to, with the one or more processors, cause the apparatus at least to perform any step of the method according to the thirteenth aspect of the present disclosure.

According to a fifteenth aspect of the present disclosure, there is provided a computer-readable medium having computer program codes embodied thereon which, when executed on a computer, cause the computer to perform any step of the method according to the thirteenth aspect of the present disclosure.

According to a sixteenth aspect of the present disclosure, there is provided an apparatus which may be implemented as a UDR. The apparatus may comprise a receiving unit and a performing unit. In accordance with some exemplary embodiments, the receiving unit may be operable to carry out at least the receiving step of the method according to the thirteenth aspect of the present disclosure. The performing unit may be operable to carry out at least the performing step of the method according to the thirteenth aspect of the present disclosure.

BRIEF DESCRIPTION OF THE DRAWINGS

The disclosure itself, the preferable mode of use and further objectives are best understood by reference to the following detailed description of the embodiments when read in conjunction with the accompanying drawings, in which.

DETAILED DESCRIPTION

Figure 1A:
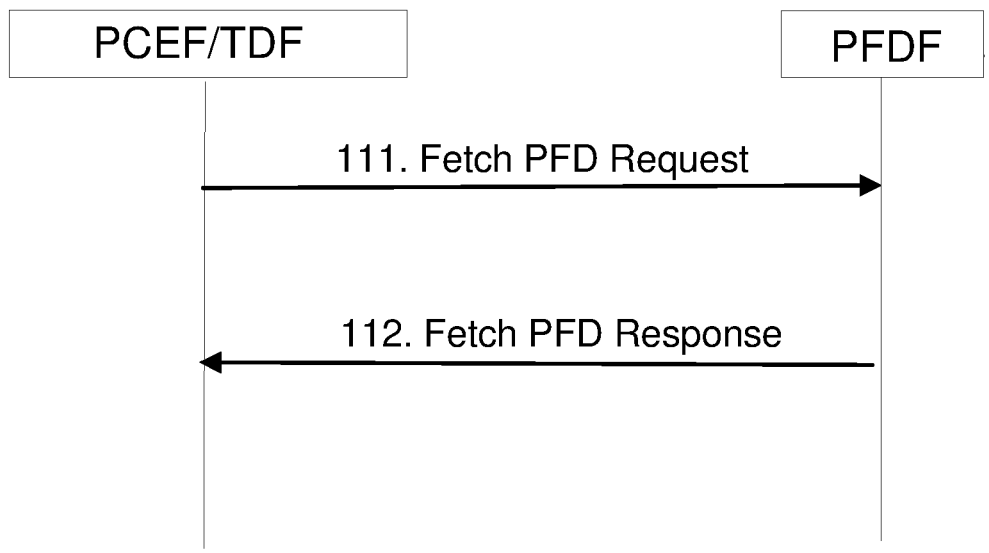
FIG. 1A is a diagram illustrating an exemplary procedure for PFD management in a "pull" mode according to some embodiments of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "communication network" refers to a network following any suitable communication standards, such as new radio (NR), long term evolution (LTE), LTE-Advanced, wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

Wireless communication networks are widely deployed to provide various telecommunication services such as voice, video, data, messaging and broadcasts. A network operator can define some policy and charging control/application detection and control (PCC/ADC) rules to allow the passage and charging control to be applied on a per service data flow and on a per application basis. The PCC/ADC rule information may depend on subscription data. A specific user data flow from and/or to a user equipment (UE) may be referred to as a packet flow. A packet flow description (PFD) may comprise a set of information enabling the detection of application traffic provided by a 3rd party service provider. As an example, the PFD may include the following information:

PFD ID; and
a 3-tuple including protocol, server side IP address and port number; or
the significant parts of the uniform resource locator (URL) to be matched, e.g. host name; or
a domain name matching criterion.

Based on the agreement between services capability server/application server (SCS/AS) and mobile operator, the PFD can be designed to convey proprietary extension for proprietary application traffic detection mechanisms. PFDs may be managed by the 3rd party SCS/AS via the service capability exposure function (SCEF), which ensures the secure access to the operator's network even from the 3rd party SCS/AS in untrusted domain. The SCS/AS may request to create, update or remove PFDs in the packet flow description function (PFDF) via the SCEF.

For PCC rules that contain an application identifier (which may refer to an application detection filter), the order and the details of the application detection are implementation specific. The application detection filter may be extended with the PFDs provided by the PFDF. Once an application has been detected, enforcement and charging may be applied under consideration of the PCC rule precedence. The management of PFDs enables the policy and charging enforcement function (PCEF) and traffic detection function (TDF) to perform accurate application detection when PFDs are provided by an ASP (via the SCEF and the PFDF) and then to apply enforcement actions as instructed in the PCC/ADC rule.

The operator is able to configure pre-defined PCC/ADC rules in the PCEF/TDF or dynamic PCC/ADC rules in the policy and charging rules function (PCRF) that include at least an application identifier for service data flow or application detection, charging control information, e.g., charging key and optionally the sponsor identifier or the ASP identifier or both. Depending on the service level agreements between the operator and the ASP, it may be possible for the ASP to provide individual PFDs or the full set of PFDs for each application identifier maintained by the ASP to the PCEF/TDF via the SCEF and the PFDF. The PFDs become part of the application detection filters in the PCEF/TDF and therefore are used as part of the logic to detect traffic generated by an application. The ASP may remove or modify some or all of the PFDs which have been provisioned previously for one or more application identifiers. When a removed/modified PFD was used to detect application traffic related to an application identifier in a PCC/ADC rule of an IP-connectivity access network (IP-CAN)/TDF session and the PCEF/TDF has reported the application start to the PCRF for the application instance corresponding to this PFD, the PCEF/TDF can report the application stop to the PCRF for the corresponding application instance identifier if the removed/modified PFD in PCEF/TDF results in that the stop of the application instance is not being able to be detected.

In accordance with some exemplary embodiments, each PFD may be identified by a PFD ID. A PFD ID may be unique in the scope of a particular application identifier. There may be different PFD types associated to an application identifier. The PFDs may be retrieved by the PCEF/TDF from the PFDF in a "pull" mode or may be provisioned from the PFDF to the PCEF/TDF in a "push" mode. When the "push" mode is used, the PFDF can distribute PFDs for each application identifier to the PCEFs/TDFs that enable access to those applications. The PFDF may be configured with the list of PCEFs/TDFs where the PFDs need to be distributed. When the "pull" mode is used, at the time a PCC/ADC rule with an application identifier for which PFDs provisioned by the PFDF are not available is activated or provisioned, the PCEF/TDF requests all PFDs for that application identifier from the PFDF. The PFDs retrieved for an application identifier from the PFDF are cached in the PCEF/TDF with an associated caching timer to control how long the PFDs are valid. When the caching timer elapses, if there are still active PCC/ADC rules that refer to the corresponding application identifier, the PCEF/TDF reloads the PFD(s) from the PFDF. When the PCEF/TDF removes the last PCC/ADC rule that refers to the corresponding application identifier, or when the caching timer expires and no PCC/ADC rule refers to the application identifier, the PCEF/TDF may remove the PFD(s) related with the application identifier.

In an exemplary embodiment where only the "pull" mode is supported in a public land mobile network (PLMN), if the allowed delay is shorter than the caching time value stored for the application identifier, or shorter than the default caching time if no application-specific caching time is stored, the PFDF sends a response to the SCEF with an indication that the allowed delay cannot be met. The PFDF may still store the PFD(s) and if so, indicate this to the SCEF. The PFDF also needs to include the caching time value in the response to the SCEF. The SCEF can forward the indication that the PFDF stored the PFD(s) (if available) and the caching time value to the ASP when informing that the allowed delay cannot be met. It will be appreciated that "push" mode only, "pull" mode only, or a combination of "pull" mode and "push" mode may be supported within a PLMN according to network configurations.

FIG. 1A is a diagram illustrating an exemplary procedure for PFD management in a "pull" mode according to some embodiments of the present disclosure. The signaling flow of PFD retrieval as depicted in FIG. 1A may be implemented in EPC. As shown in FIG. 1A, a PCEF/TDF can fetch from a PFDF PFDs for specific application identifier(s) by sending 111 a fetch PFD request in which the application identifier(s) may be included. According to an exemplary embodiment, a PCEF may be implemented in a packet data network gateway (P-GW) node. The PFDF can respond 112 with a list of the application identifier(s) and the associated PFDs in a fetch PFD response message. The PCEF/TDF can bind the PFDs received from the PFDF to the respective application identifier.

The exemplary procedure shown in FIG. 1A enables the PCEF/TDF to retrieve PFDs for an application identifier from the PFDF when a PCC/ADC rule with an application identifier is provisioned/activated and PFDs provisioned by the PFDF are not available at the PCEF/TDF. In addition, this procedure enables the PCEF/TDF to retrieve PFDs from the PFDF when the caching timer for an application identifier elapses and a PCC/ADC rule for this application identifier is still active. It can be appreciated that the PCEF/TDF may retrieve PFDs for one or more application identifiers in the same request. All PFDs related to an application identifier can be provided in the response from the PFDF.

Figure 1B:
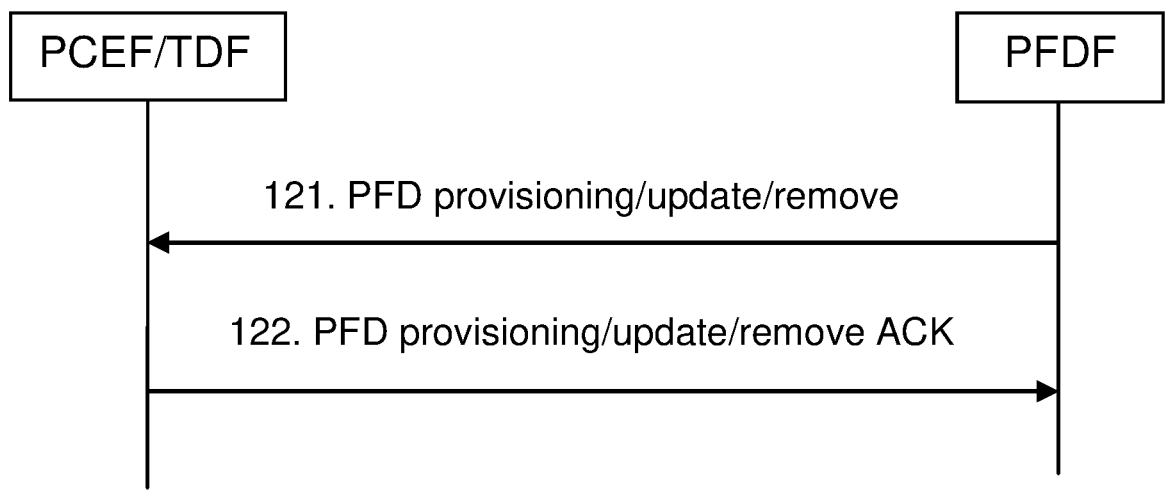
FIG. 1B is a diagram illustrating an exemplary procedure for PFD management in a "push" mode according to some embodiments of the present disclosure.

FIG. 1B is a diagram illustrating an exemplary procedure for PFD management in a "push" mode according to some embodiments of the present disclosure. The signaling flow of PFD management as depicted in FIG. 1B may be implemented in EPC. As shown in FIG. 1B, a PFDF may provision, update or remove one, multiple or all PFDs associated with an application identifier by sending 121 a PFD management message to a PCEF/TDF. The PFDF may manage PFDs for more than one application identifier at the same time. Alternatively, the PFDF may provision, update or remove a list of all PFDs associated with all application identifiers. Optionally, the PFDF may also provide a PFD ID for each PFD provided. The PCEF/TDF can bind (for provision or update) or unbind (for removal) the PFDs to the application identifier received from the PFDF. The provisioning of PFDs can associate new PFDs to an application identifier. The update of PFDs can modify the existing PFDs associated to an application identifier. The removal of PFDs can remove some or all existing PFDs associated to an application identifier. The PCEF/TDF can acknowledge 122 the reception of the PFDs to the PFDF.

The exemplary procedure shown in FIG. 1B enables the provisioning, modification or removal of PFDs associated with an application identifier in the PCEF/TDF via the PFDF. According to this procedure, the complete list of all PFDs of all application identifiers, the complete list of all PFDs of one or more application identifiers, or a subset of PFDs for individual application identifiers may be managed. In the case that a subset of the PFD(s) associated with an application identifier can be provisioned, updated or removed, each PFD of an application identifier may be associated with a PFD ID. In the case that always the full set of PFD(s) for an application identifier is managed in each transaction, PFD IDs may not need to be provided. According to an exemplary embodiment, in order to provision or update PFDs, it is required that the application identifier which the external entity provided is mapped into the application identifier that is included in the PCC/ADC rule.

In accordance with an exemplary embodiment, the interaction between the PFDF and the PCEF/TDF is not related to an IP-CAN session. The PFDF may decide to delay the distribution of PFDs to PCEFs/TDFs for some time to optimize the signaling load over the Gw/Gwn interface. If the PFDF receives a parameter of allowed delay for a PFD, the PFDF needs to distribute this PFD within the indicated time interval.

Figure 1C:
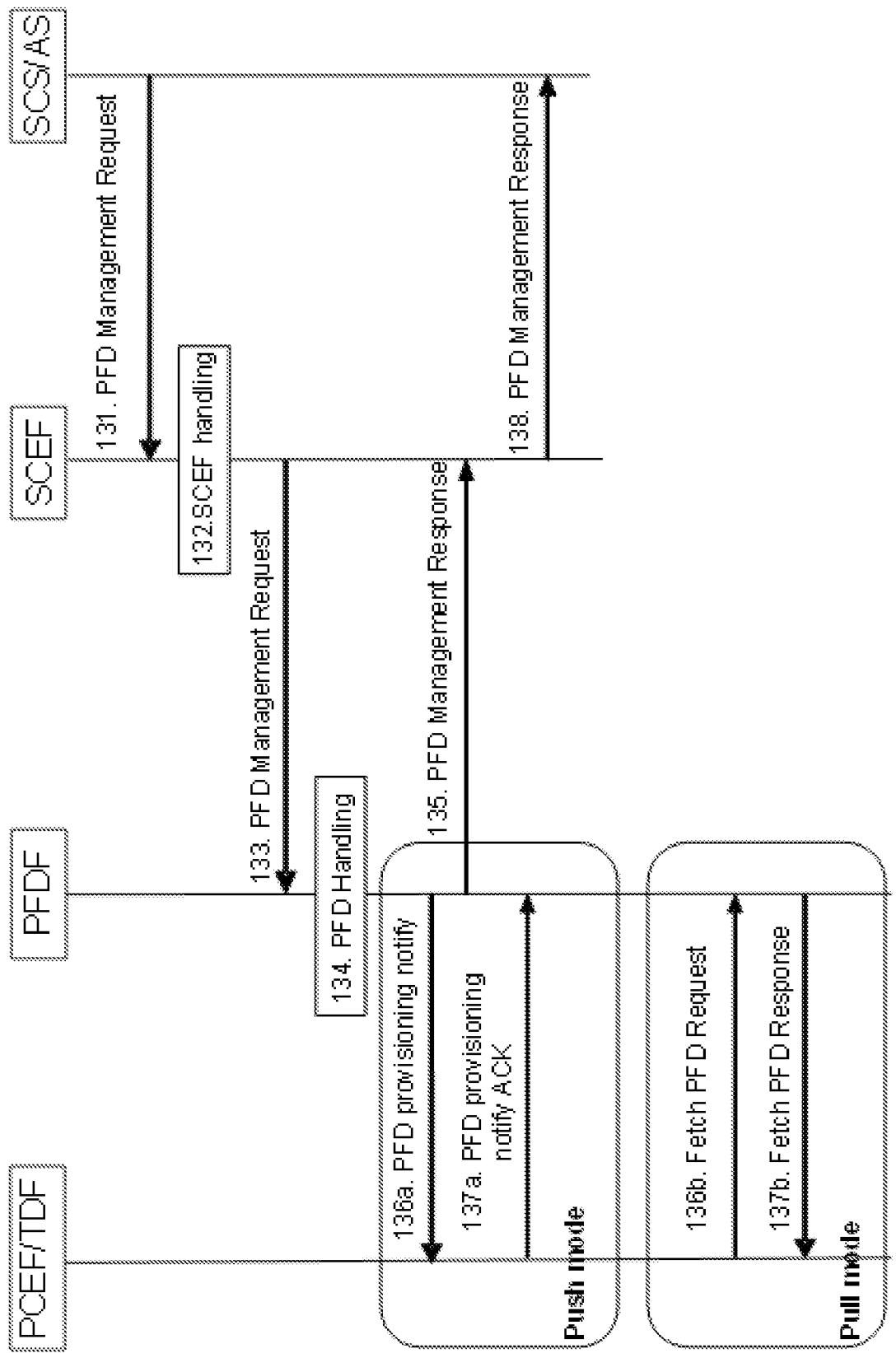
FIG. 1C is a diagram illustrating an exemplary procedure for PFD management in EPC according to some embodiments of the present disclosure.

FIG. 1C is a diagram illustrating an exemplary procedure for PFD management in EPC according to some embodiments of the present disclosure. This exemplary procedure may be performed to enable a SCS/AS to manage PFDs into a network via a SCEF. As shown in FIG. 1C, the SCS/AS can send 131 a PFD management request message (e.g., including a SCS/AS identifier, an external application identifier(s) and one or more sets of PFDs and PFD operation for each application identifier, allowed delay, etc.) to the SCEF. The PFD operation may indicate that the PFD is to be created, updated or removed in the network. The allowed delay is an optional parameter. If the allowed delay is included, it indicates that the PFDs in this request need to be deployed within the time interval indicated by the allowed delay. Based on the network policies, the SCEF can perform 132 corresponding handling on the PFD management request. For example, if the SCS/AS is authorized to perform this request, the SCEF can translate the external application identifier to the corresponding application identifier known at a PFDF. Then the SCEF can send 133 a PFD management request message (e.g., including an application identifier(s), one or more sets of PFDs and PFD operation for each application identifier, allowed delay, etc.) to the PFDF. The PFDF can perform 134 PFD handling as requested by the SCEF. For example, the PFDF may create, update or delete a list of PFDs for each application identifier as requested by the respective PFD operation. Then the PFDF sends 135 a PFD management response message (e.g., including an application identifier(s), a cause, etc.) to the SCEF to provide the feedback of the handling result for the PFD management request. Correspondingly, the SCEF can send 138 a PFD management response message (e.g., including a cause, etc.) to the SCS/AS to provide the feedback of the handling result for the PFD management request.

In accordance with some exemplary embodiments, the interaction between the PFDF and a PCEF/TDF for PFD management may be implemented in a "push" mode by signaling operations 136a-137a, in a "pull" mode by signaling operations 136b-137b, or in a combination mode by signaling operations 136a-137a and 136b-137b. Optionally, the signaling operation 136a may happen before or after the signaling operation 135, depending on the implementation.

In the case of "push" mode, as described with respect to FIG. 1C, the PFDF can send 136a a PFD provisioning notify message to the PCEF/TDF. As a response, the PFDF may receive 137a a PFD provisioning notify acknowledgement (ACK) message from the PCEF/TDF. In the case of "pull" mode, as described with respect to FIG. 1C, the PCEF/TDF can send 136b a fetch PFD request message to the PFDF, and the PFDF may transmit 137b a fetch PFD response message to the PCEF/TDF. Optionally, the combination mode in which both signaling operations 136a-137a and 136b-137b are performed may also be supported according to specific network configurations.

Figure 2A:
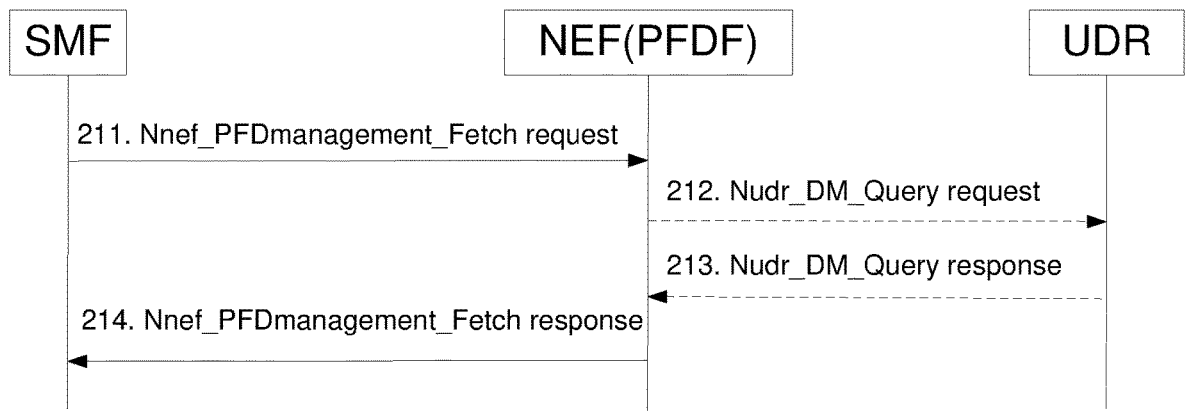
FIG. 2A is a diagram illustrating another exemplary procedure for PFD management in a "pull" mode according to some embodiments of the present disclosure.

FIG. 2A is a diagram illustrating another exemplary procedure for PFD management in a "pull" mode according to some embodiments of the present disclosure. The signaling flow of PFD retrieval as depicted in FIG. 2A may be implemented in 5GC via a session management function (SMF). As shown in FIG. 2A, in order to retrieve PFDs of an application identifier(s), the SMF may send 211 a Nnef_PFDmanagement_Fetch request message to a network exposure function (NEF)/PFDF. The SMF may retrieve PFDs for one or more application identifiers in the same request transmitted to the NEF (PFDF). The NEF (PFDF) checks if the PFDs for the application identifier(s) are available in the NEF (PFDF). If the requested PFDs are not available in the PFDF, the PFDF can send 212 a Nudr_DM_ Query request message to a user data repository (UDR) to retrieve the PFDs. The UDR can transmit 213 a Nudr_DM_ Query response message including the requested PFDs to the NEF (PFDF). According to an exemplary embodiment, all PFDs related to an application identifier can be provided in the response from the UDR to the NEF (PFDF). The NEF (PFDF) can reply 214 to the SMF with a Nnef_PFDmanagement_Fetch response message including the PFDs for the requested application identifier(s). It can be realized that the signaling operations 212-213 for the retrieval of PFDs from the UDR by the NEF (PFDF) are not necessary, for example, in the case that the PFDs requested by the SMF are available in the PFDF.

The exemplary procedure shown in FIG. 2A enables the SMF to retrieve PFDs for an application identifier from the NEF (PFDF) when a PCC rule with this application identifier is provided/activated and PFDs provided by the NEF (PFDF) are not available at the SMF. In addition, this procedure enables the SMF to retrieve PFDs from the NEF (PFDF) when the caching timer for an application identifier elapses and a PCC rule for this application identifier is still active. The NEF (PFDF) retrieves PFDs from the UDR unless the PFDs are already available in the NEF (PFDF).

Figure 2B:
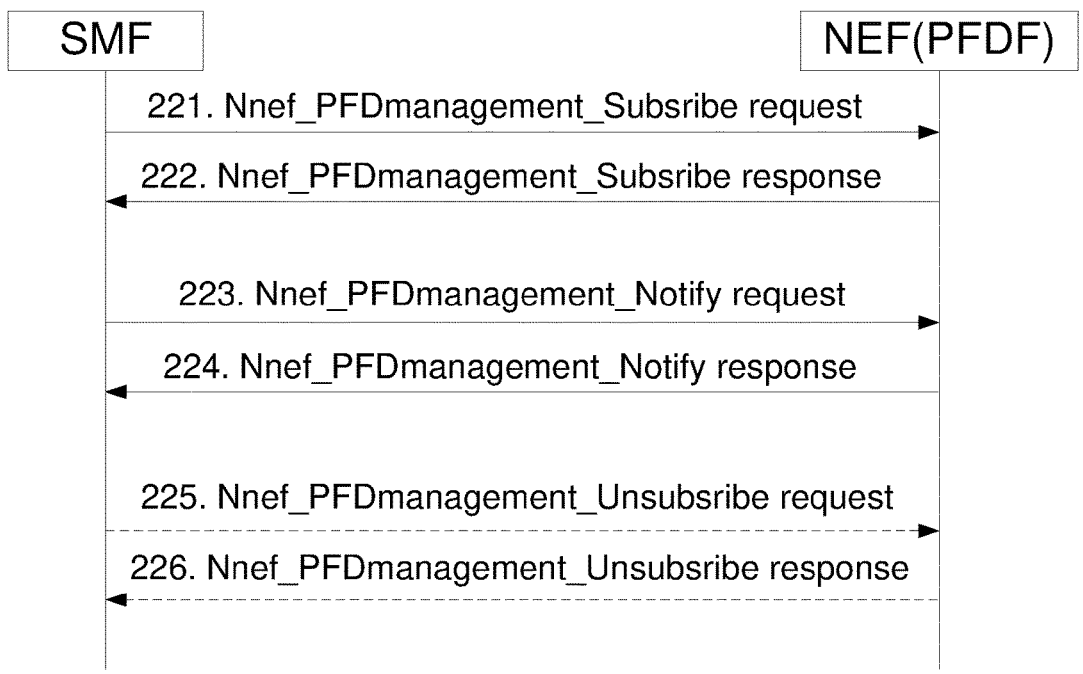
FIG. 2B is a diagram illustrating another exemplary procedure for PFD management in a "push" mode according to some embodiments of the present disclosure.

FIG. 2B is a diagram illustrating another exemplary procedure for PFD management in a "push" mode according to some embodiments of the present disclosure. The signaling flow of PFD management as depicted in FIG. 2B may be implemented in 5GC. As shown in FIG. 2B, in order to subscribe the notification of events when the PFDs for an application identifier(s) change, a SMF can send 221 a Nnef_PFDmanagement_Subscribe request message to a NEF (PFDF). The NEF (PFDF) may send 222 a Nnef_PFDmanagement_Subscribe response message to the SMF. By sending 223 a Nnef_PFDmanagement_Notify request message to the SMF, the NEF (PFDF) can update and/or delete the PFDs for the application identifier(s) in the SMF as subscribed previously. The SMF may reply 224 a Nnef_PFDmanagement_Notify response message to the NEF (PFDF). Optionally, the SMF may send 225 a Nnef_PFDmanagement_Unsubscribe request message to the NEF (PFDF) to remove the subscription. The NEF (PFDF) can reply 226 a Nnef_PFDmanagement_Unsubscribe response message to the SMF to indicate that the subscription is removed.

Figure 2C:
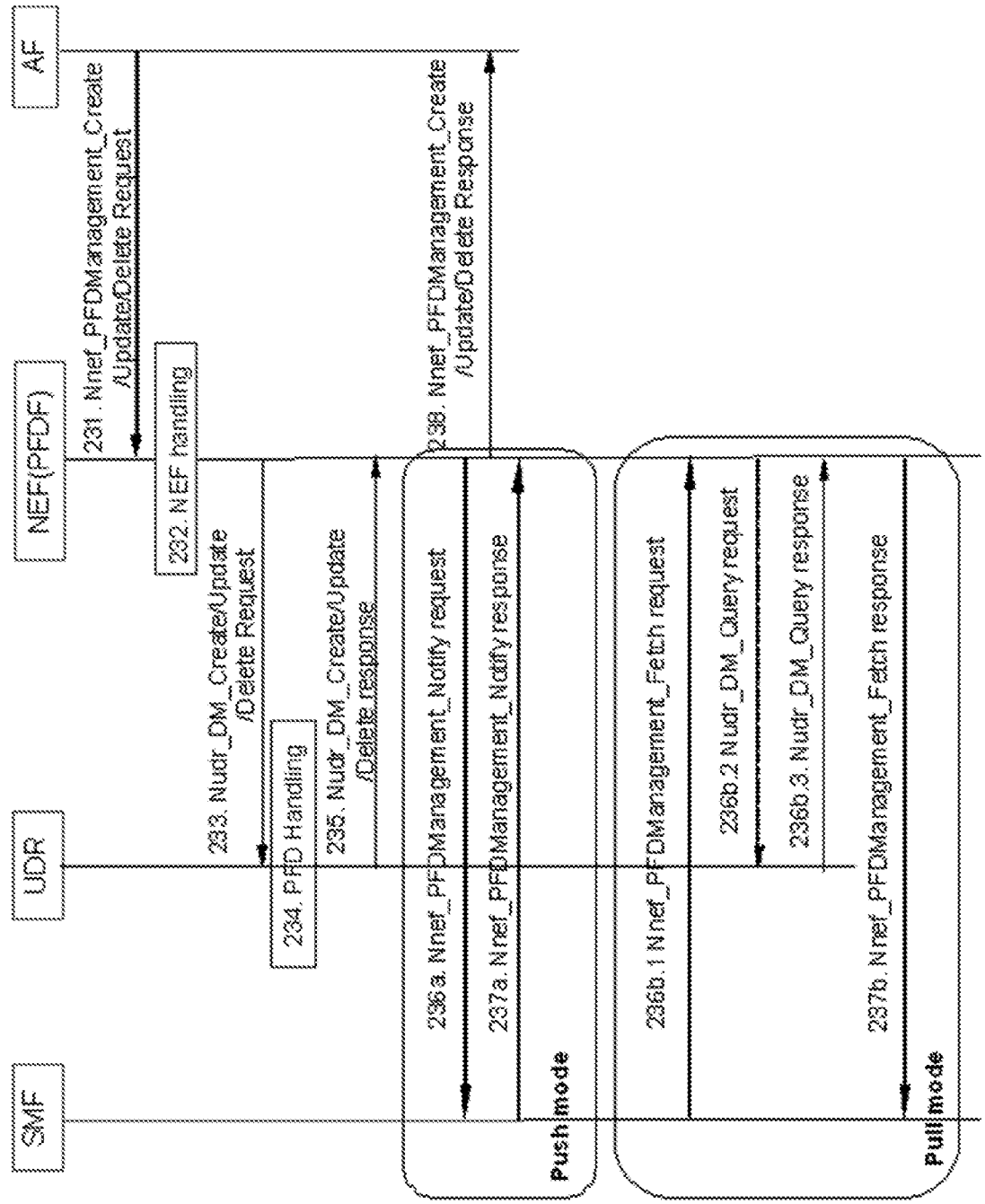
FIG. 2C is a diagram illustrating an exemplary procedure for PFD management in 5GC according to some embodiments of the present disclosure.

FIG. 2C is a diagram illustrating an exemplary procedure for PFD management in 5GC according to some embodiments of the present disclosure. This exemplary procedure may be performed to enable an application function (AF) to manage PFDs into a network via a NEF (PFDF). As shown in FIG. 2C, the AF can invoke a PFD management service, for example, by sending 231 a Nnef_PFDManagement_Create/Update/Delete request message to the NEF (PFDF). The allowed delay is an optional parameter in the request message. If the allowed delay is included, it indicates that a list of PFDs in this request needs to be deployed within the time interval indicated by the allowed delay. Based on the network policies, the NEF (PFDF) can perform 232 corresponding handling according to the received request. The NEF (PFDF) may send 233 a Nudr_DM_Create/Update/Delete request message (e.g., including an application identifier, one or more sets of PFDs, allowed delay, etc.) to a UDR. Correspondingly, the UDR can perform 234 PFD handling as requested by the NEF (PFDF). For example, the UDR may update the list of PFDs for the application identifier. Then the UDR can send 235 a Nudr_DM_Create/Update/Delete response message to the NEF (PFDF), and the NEF (PFDF) can send 238 a Nnef PFDManagement_Create/Update/Delete response message to the AF.

Similar to the procedure in FIG. 1C, according to the procedure in FIG. 2C, the NEF (PFDF) can push the PFD related information to the SMF based on the subscription of PFD change (e.g., by signaling operations 236a-237a), or the SMF can actively fetch the PFD related information from the NEF (PFDF) (e.g., by signaling operations 236b.1-237b). In accordance with an embodiment, only two modes (e.g., push mode and pull mode) can be supported in the procedure as shown in FIG. 2C, which is different from the PFD management procedure in EPC as shown in FIG. 1C. There is no combination mode in 5GC because the SMF can decide which mode to use.

In the case of "push" mode, the PFD change subscription as shown in FIG. 2B may happen at any time and it is required for the NEF (PFDF) to push the PFD. The NEF (PFDF) can send 236a a Nnef_PFDmanagement_Notify request message to the SMF. The SMF can reply 237a a Nnef_PFDmanagement_Notify response message to the NEF (PFDF). It can be appreciated that the signaling operation 236a may happen between the signaling operation 232 and the signaling operation 238, or even after the signaling operation 238, depending on the implementation. In the case of "pull" mode, the NEF (PFDF) may receive 236b.1 a pull request (e.g., a Nnef_PFDmanagement_Fetch request) message from the SMF at any time. The PFD is successfully returned 237b to the SMF (e.g., in a Nnef_PFDmanagement_Fetch response) if available and valid. In the case that there is no PFD available for the requested application, the NEF (PFDF) may fetch the PFD from the UDR, for example, by sending 236b.2 a Nudr_DM_Query request message to the UDR and receiving 236b.3 a Nudr_DM_Query response message from the UDR.

Typically, the criteria for domain name matching in the PFD does not indicate to which protocol(s) (e.g., domain name system (DNS), transport layer security (TSL), etc.) and protocol parameter(s) (e.g., DNS query domain name, TLS client hello server name indication (SNI), TLS server certificate's subject alternative name (SAN), TLS server certificate's subject common name (SCN), etc.) it applies to. It is not clear whether it refers to "match all protocols" or only to hypertext transfer protocol secure (HTTPS) traffic (e.g., TLS SNI, TLS SAN, TLS SCN, etc.). If it refers only to HTTPS traffic (e.g., domain name=ApplicationX.com), in the case that ApplicationX is sponsored and the user has no remaining quota, the DNS traffic may not match any of the PFD rules for ApplicationX, so it may be potentially blocked and this may break the sponsored data use case.

In addition, there are some scenarios where traffic handling may be different for various protocols, e.g. DNS and TLS:
  The quality of service (QoS) to be applied to DNS and video streaming over TLS may be quite different.
  Forwarding actions for DNS usually need to take traffic to a central gateway user plane, while it may be more efficient for video traffic to be forwarded to a local content delivery network (CDN), when available.
  There are well known amplification attacks placed on DNS traffic, so it is useful to perform service chaining to some dedicated firewall function. This may not be the case for TLS traffic.

Based on the above, supporting the possibility to indicate the protocol applicable for the domain name may allow more correct traffic handling.

On the other hand, the current definition of PFD makes it impossible to combine URL information and IP address information in the same PFD (which means performing a logical "AND" operation on the URL information and the IP address information so as to use both kinds of information for traffic detection), since only one kind of information among URL information, IP information and domain name information can exist for a PFD. An exemplary definition of PFD is shown in Table 1 as below.

TABLE 1

| Attribute name | Data type | Cardinality | Description |
| --- | --- | --- | --- |
| pfdId | string | 1 | Identifies a PFD of an application identifier. |
| flowDescriptions | array(string) | 0..N | Represents a 3-tuple with protocol, server ip and server port for uplink/downlink application traffic. |
| urls | array(string) | 0..N | Indicates a URL or a regular expression which is used to match the significant parts of the URL. |
| domainNames | array(string) | 0..N | Indicates a fully qualified domain name (FQDN) or a regular expression as a domain name matching criteria. |

According to the definition of PFD as shown in Table 1, one of the properties "flowDescriptions", "urls" or "domainNames" needs to be included in a PFD. This brings an issue to avoid malicious users who use fake hostname for the traffic to be sponsored.

In order to improve traffic detection and traffic handling, the present disclosure according to some exemplary embodiments proposes to allow PFD extension, for example, by providing protocol details, so as to support more accurate PFD matching in domain name and to support multiple PFD matching criteria. According to the proposed solution, some changes may be made for the protocol details to support more accurate traffic detection and/or correct traffic handling. For example, the matching protocols (e.g., DNS, TLS, etc.) for the domain name can be indicated by adding an additional protocol field, attribute and/or parameter such as dn-protocol. Alternatively or additionally, a combination condition or criterion of PFDs can be indicated by a new property, attribute and/or parameter such as pfd-combinations. In this case, the fraud requests from malicious users can be avoided by additionally checking the legitimate IP addresses besides the domain name.

In accordance with some exemplary embodiments, one or more network interfaces may be involved in the change of protocol details. For Nu interface and Gw/Gwn interface, a new field such as "dn-protocol" can be added in message field "pfd", which is applicable for the new feature about a domain name matching condition. Alternatively or additionally, a new field such as "pfd-combinations" can be added in message field "pfds-root", which is applicable for the new feature about PFD combination. For N29 interface and N37 interface, a new attribute such as "dn-protocol" can be added in data type "PfdDataForApp", which is applicable for the new feature about a domain name matching condition. Alternatively or additionally, a new attribute such as "pfd-combinations" can be added in data type "PfdContent", which is applicable for the new feature about PFD combination. For T8 interface and N33 interface, a new attribute such as "dn-protocol" can be added in data type "Pfd", which is applicable for the new feature about a domain name matching condition. Alternatively or additionally, a new attribute such as "pfd-combinations" can be added in data type "PfdData", which is applicable for the new feature about PFD combination.

In accordance with an exemplary embodiment, a PFD combination condition/criterion may be represented by a property/attribute/parameter such as "pfd-combinations" which indicates PFDs (e.g., by PFD identifiers) to be used together for detecting an application. This means that all PFDs indicated by "pfd-combinations" need to be matched in detecting the application. Without the property "pfd-combinations", the logical OR operation applies for the multiple PFD instances for traffic detection. With property "pfd-combinations", it can specify the logical AND operation for multiple PFD instances which are used together to match the packet. Optionally, the rest individual PFD instances which are not specified by the property "pfdCombinations" can still keep the logical OR operation among the individual PFD instances or the combined PFD instances.

In accordance with an exemplary embodiment, a domain name matching condition/criterion may be represented by a property/attribute/parameter such as "dn-protocol" which indicates the additional protocol and/or protocol field for domain names to be matched. This property may be applicable when the attribute "domainNames" is present in a PFD. According to an exemplary embodiment, the property "dn-protocol" may comprise at least one of the following parameters:

DNS_QNAME: which identifies the DNS protocol and the question name in a DNS query;

TLS_SNI: which identifies the server name indication in TLS ClientHello message;

TLS_SAN: which identifies the subject alternative name in TLS ServerCertificate message; and TLS_SCN: which identifies the subject common name in TLS ServerCertificate message.

It can be appreciated that the properties/attributes/parameters such as "pfd-combinations" or "dn-protocol" are just examples. Other suitable parameter settings, the associated parameter names and the specific values thereof may also be applicable to implement the proposed solutions.

Figure 3A:
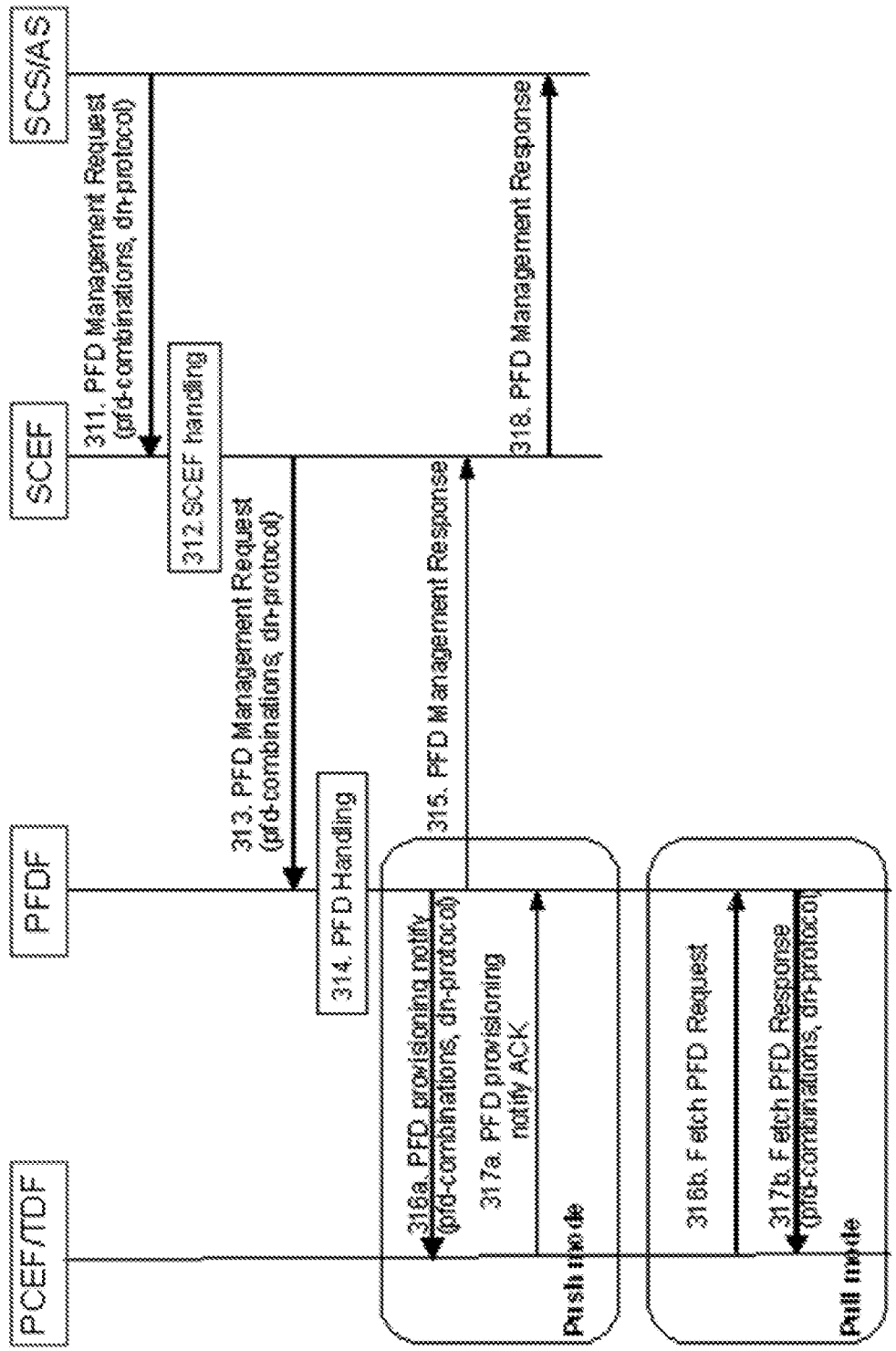
FIG. 3A is a diagram illustrating another exemplary procedure for PFD management in EPC according to some embodiments of the present disclosure.

FIG. 3A is a diagram illustrating another exemplary procedure for PFD management in EPC according to some embodiments of the present disclosure. Similar to the procedure in FIG. 1C, the exemplary procedure in FIG. 3A may be performed to enable a SCS/AS to manage PFDs into a network via a SCEF. The difference is in the PFD extension to support more accurate traffic detection. As shown in FIG. 3A, the SCS/AS can send 311 a PFD management request message (e.g., including a SCS/AS identifier, an external application identifier(s) and one or more sets of PFDs and PFD operation for each application identifier, allowed delay, etc.) to the SCEF. According to an exemplary embodiment, the PFD management request message received by the SCEF may include one or more parameters such as pfd-combinations and/or dn-protocol to indicate a PFD combination condition and/or domain name applicable protocols (e.g., which may be treated as a domain name matching condition).

Based on the network policies, the SCEF can perform 312 corresponding handling on the PFD management request. Then the SCEF can send 313 a PFD management request message (e.g., including an application identifier(s), one or more sets of PFDs and PFD operation for each application identifier, allowed delay, etc.) to the PFDF. According to an exemplary embodiment, the PFD management request message received by the PFDF may include one or more parameters such as pfd-combinations and/or dn-protocol to indicate a PFD combination condition and/or domain name applicable protocols. Correspondingly, the PFDF can perform 314 PFD handling as requested by the SCEF, and send 315 a PFD management response message to the SCEF to provide the feedback of the handling result for the PFD management request. The SCEF can send 318 a PFD management response message to the SCS/AS to provide the feedback of the handling result for the PFD management request.

In accordance with some exemplary embodiments, the interaction between the PFDF and a PCEF/TDF for PFD management may be implemented in a "push" mode, a "pull" mode, or a combination mode, as described in connection with FIG. 1C. In the case of "push" mode, as illustrated in FIG. 3A, the PFDF can send 316a a PFD provisioning notify message to the PCEF/TDF. According to an exemplary embodiment, the PFD provisioning notify message may include one or more parameters such as pfd-combinations and/or dn-protocol to indicate a PFD combination condition and/or domain name applicable protocols. As a response, the PFDF may receive 317a a PFD provisioning notify ACK message from the PCEF/TDF. Alternatively or additionally, in the case of "pull" mode, the PCEF/TDF may send 316b a fetch PFD request message to the PFDF, and the PFDF may transmit 317b a fetch PFD response message to the PCEF/TDF. According to an exemplary embodiment, the fetch PFD response message may include one or more parameters such as pfd-combinations and/or dn-protocol to indicate a PFD combination condition and/or domain name applicable protocols.

Figure 3B:
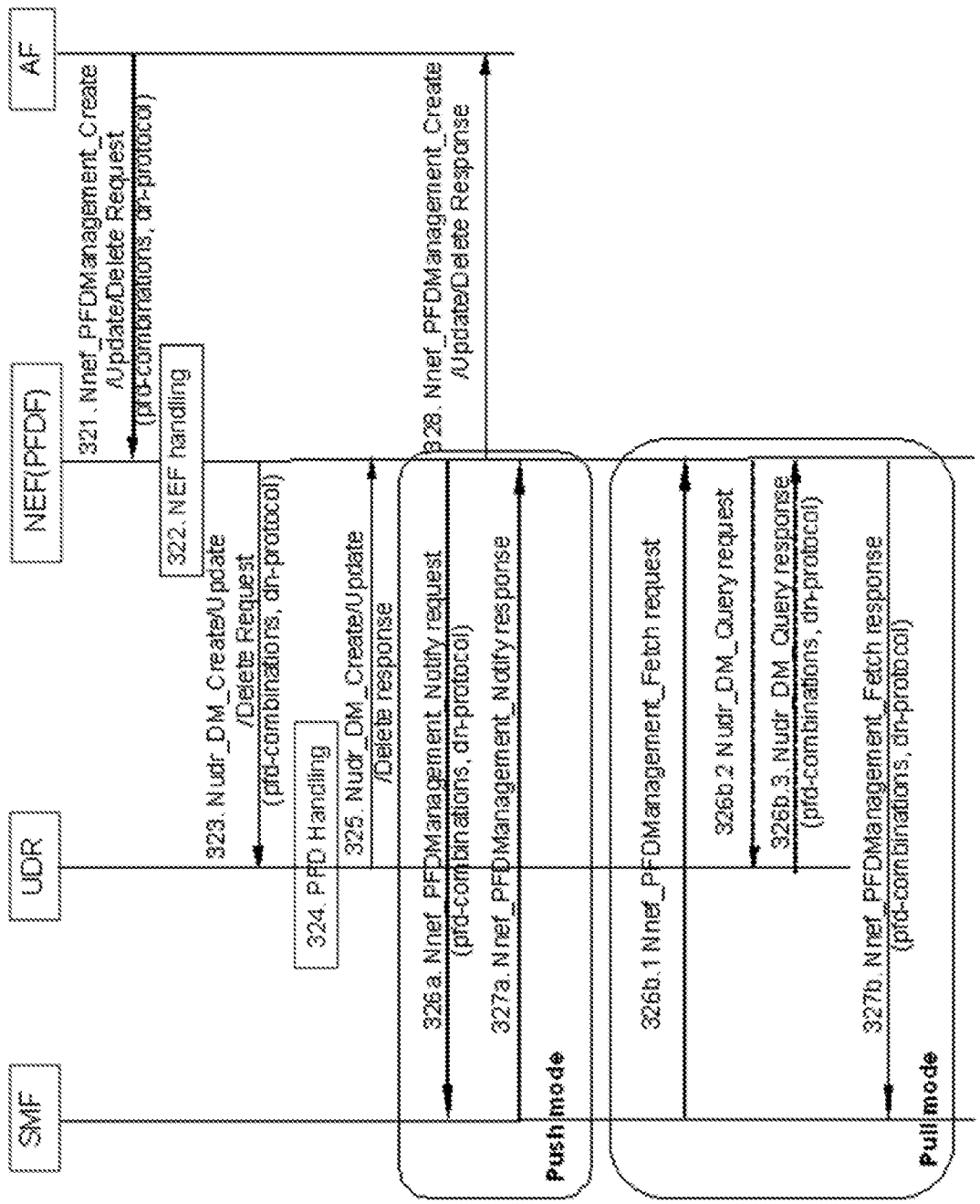
FIG. 3B is a diagram illustrating another exemplary procedure for PFD management in 5GC according to some embodiments of the present disclosure.

FIG. 3B is a diagram illustrating another exemplary procedure for PFD management in 5GC according to some embodiments of the present disclosure. Similar to the procedure in FIG. 2C, the exemplary procedure in FIG. 3B may be performed to enable an AF to manage PFDs into a network via a NEF (PFDF). As shown in FIG. 3B, the AF can invoke a PFD management service by sending 321 a Nnef_PFDManagement_Create/Update/Delete request message to the NEF (PFDF). According to an exemplary embodiment, the Nnef_PFDManagement_Create/Update/Delete request message may include one or more parameters such as pfd-combinations and/or dn-protocol to indicate a PFD combination condition and/or domain name applicable protocols.

Based on the network policies, the NEF (PFDF) can perform 322 corresponding handling according to the received request. Then the NEF (PFDF) may send 323 a Nudr_DM_Create/Update/Delete request message (e.g., including an application identifier, one or more sets of PFDs, allowed delay, etc.) to a UDR. According to an exemplary embodiment, the Nudr_DM_Create/Update/Delete request message may include one or more parameters such as pfd-combinations and/or dn-protocol to indicate a PFD combination condition and/or domain name applicable protocols. Correspondingly, the UDR can perform 324 PFD handling as requested by the NEF (PFDF), and send 325 a Nudr_DM_Create/Update/Delete response message to the NEF (PFDF). The NEF (PFDF) can send 328a Nnef_PFD-Management_Create/Update/Delete response message to the AF.

In accordance with some exemplary embodiments, the interaction between the NEF (PFDF) and a SMF for PFD management may be implemented in a "push" mode or a "pull" mode, as described in connection with FIG. 2C. In the case of "push" mode, the NEF (PFDF) can send 326a a Nnef_PFDmanagement_Notify request message to the SMF. According to an exemplary embodiment, the Nnef_PFD-management_Notify request message may include one or more parameters such as pfd-combinations and/or dn-protocol to indicate a PFD combination condition and/or domain name applicable protocols. The SMF can reply 327a a Nnef_PFDmanagement_Notify response message to the NEF (PFDF). In the case of "pull" mode, the NEF (PFDF) may receive 326b.1 a Nnef_PFDmanagement_Fetch request message from the SMF, and provide 327b the requested PFD (if available and valid) to the SMF in a Nnef PFDmanagement_Fetch response message. According to an exemplary embodiment, the Nnef PFDmanagement_Fetch response message may include one or more parameters such as pfd-combinations and/or dn-protocol to indicate a PFD combination condition and/or domain name applicable protocols. In the case that there is no PFD available for the requested application, the NEF (PFDF) may fetch the PFD from the UDR, for example, by sending 326b.2 a Nudr_DM_ Query request message to the UDR and receiving 326b.3 a Nudr_DM_Query response message from the UDR. According to an exemplary embodiment, the Nudr_DM_Query response message may include one or more parameters such as pfd-combinations and/or dn-protocol to indicate a PFD combination condition and/or domain name applicable protocols.

It will be appreciated that signaling messages and network elements shown in FIGS. 1A-3B are just as examples, and more or less alternative signaling messages and network elements may be involved in the PFD management according to the embodiments of the present disclosure.

It is noted that some embodiments of the present disclosure are mainly described in relation to LTE or NR specifications being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does naturally not limit the present disclosure in any way. Rather, any other system configuration or radio technologies may equally be utilized as long as exemplary embodiments described herein are applicable.

Figure 4:
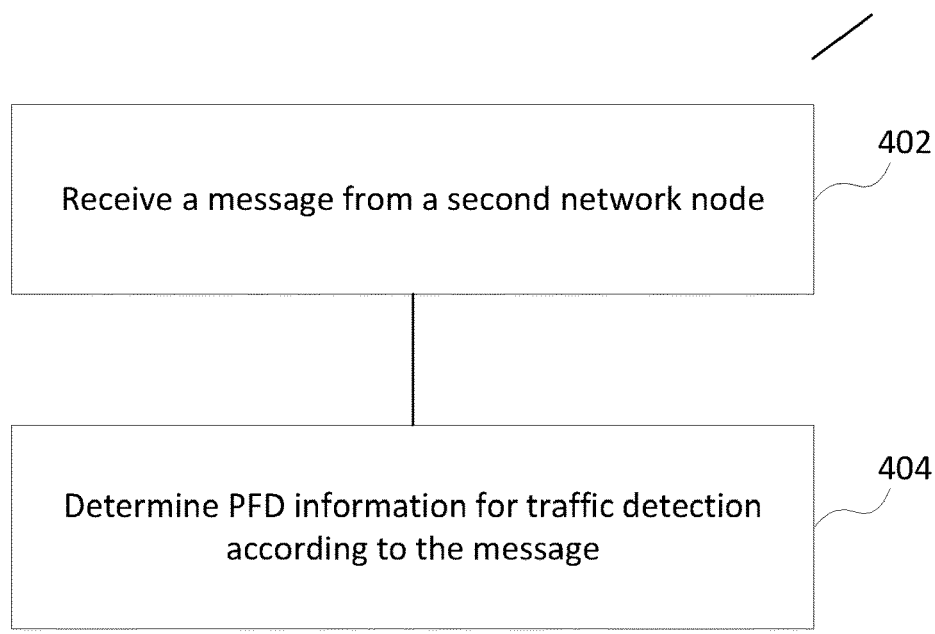
FIG. 4 is a flowchart illustrating a method according to some embodiments of the present disclosure.

FIG. 4 is a flowchart illustrating a method 400 according to some embodiments of the present disclosure. The method 400 illustrated in FIG. 4 may be performed by a first network node or an apparatus communicatively coupled to the first network node. In accordance with an exemplary embodiment, the first network node may comprise a network node with PFDF. Optionally, the first network node may be implemented as a PFDF, a NEF (PFDF), or any other suitable network function or entity which may be able to get PFD information provisioned by a second network node (such as a SCS, an AS, an AF, etc.) and provide the PFD information to a third network node (such as PCEF, TDF, SMF, etc.).

According to the exemplary method 400 illustrated in FIG. 4, the first network node may receive a message from a second network node, as shown in block 402. In accordance with some exemplary embodiments, the second network node may comprise a SCS, an AS, a network node with an AF, etc. It can be realized that the second network node may also be implemented as an AF instance. According to an exemplary embodiment, the message from the second network node may comprise a PFD management request (e.g., the PFD management request as described with respect to FIG. 3A, or the Nnef_PFDManagement_Create/Update/Delete request as described with respect to FIG. 3B). The first network node may receive the message from the second network node directly (e.g., as shown in FIG. 3B). Alternatively, the message from the second network node may be received by the first network node via an intermediate network node with a SCEF (e.g., as shown in FIG. 3A).

According to the message from the second network node, the first network node can determine PFD information for traffic detection, as shown in block 404. The PFD information may indicate at least one of: a combination criterion for two or more PFDs, and a protocol matching criterion for a domain name in a PFD. In accordance with some exemplary embodiments, the combination criterion for the two or more PFDs may indicate (e.g., by parameter "pfd-combinations") that the two or more PFDs need to be used together for the traffic detection. This feature can support using multiple PFDs (e.g., by performing a logical AND operation on the multiple PFDs) to detect an application. In an exemplary embodiment, the logical AND operation applied on the two or more PFDs means that all of the two or more PFDs need to be matched in the traffic detection.

In accordance with some exemplary embodiments, the protocol matching criterion for the domain name may indicate one or more protocols applicable for the domain name (e.g., by parameter "dn-protocol"). This feature can support the additional protocol matching condition for the domain name in PFD data. As an example, the one or more protocols may comprise a DNS protocol, a TLS protocol, and/or any other suitable protocol which may be applicable for the domain name.

In accordance with some exemplary embodiments, the protocol matching criterion for the domain name may indicate one or more protocol parameters. For example, the one or more protocol parameters may indicate or identify at least one of: a query name in a protocol message (e.g., by parameter "DNS_QNAME"), a server name in a protocol message (e.g., by parameter "TLS_SNI"), a subject alternative name in a protocol message (e.g., by parameter "TLS_SAN"), and a subject common name in a protocol message (e.g., by parameter "TLS_SCN").

In accordance with some exemplary embodiments, the first network node can update information in a database by using the PFD information. For example, the database may comprise a UDR. According to an exemplary embodiment, the information update in the database may comprise creating one or more new records corresponding to the PFD information, and/or modifying the existing records based at least in part on the PFD information, as described with respect to FIG. 3B.

Optionally, the first network node may notify a third network node of the PFD information. In accordance with some exemplary embodiments, the third network node may comprise a network node with a PCEF, a TDF and/or a SMF. For example, the third network node may be informed of the PFD information by the first network node in a "push" mode, as described in connection with signaling operations 316a-317a in FIG. 3A and signaling operations 326a-327a in FIG. 3B. Alternatively or additionally, the third network node may retrieve the PFD information from the first network node in a "pull" mode, as described in connection with signaling operations 316b-317b in FIG. 3A and signaling operations 326b.1-327b in FIG. 3B.

In accordance with an exemplary embodiment where the "pull" mode is supported for PFD management, the first network node may receive from the third network node a first request (e.g. the request as described in connection with signaling operation 316b in FIG. 3A or signaling operation 326b.1 in FIG. 3B) for PFD information, and transmitting a response to the first request to the third network node. The response (e.g. the response as described in connection with signaling operation 317b in FIG. 3A or signaling operation 327b in FIG. 3B) may indicate the PFD information which is determined by the first network node according to the message from the second network node. In this case, the PFD information requested by the third network node is available at the first network node.

Alternatively or additionally, the PFD information requested by the third network node may not be available at the first network node. In this case, in response to receiving from the third network node a second request (e.g. the request as described in connection with signaling operation 326b.1 in FIG. 3B) for PFD information, the first network node can query a database (such as a UDR) for the requested PFD information and obtain the requested PFD information from the database (e.g., by signaling operations 326b.2-326b.3 in FIG. 3B). Then the first network node can transmit a response to the second request to the third network node. The response (e.g. the response as described in connection with signaling operation 327b in FIG. 3B) may indicate the PFD information obtained from the database.

Figure 5:
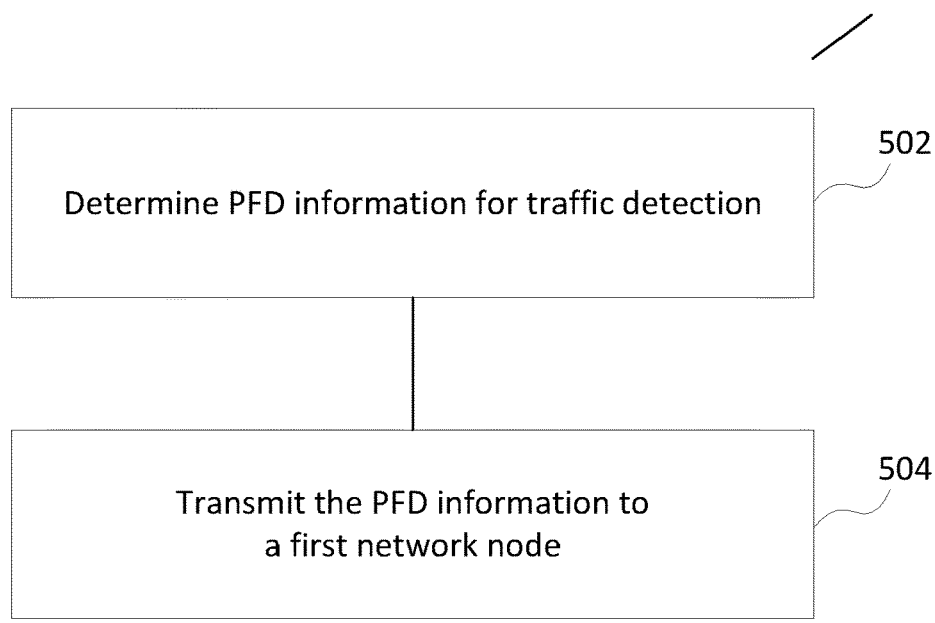
FIG. 5 is a flowchart illustrating another method according to some embodiments of the present disclosure.

FIG. 5 is a flowchart illustrating a method 500 according to some embodiments of the present disclosure. The method 500 illustrated in FIG. 5 may be performed by a second network node or an apparatus communicatively coupled to the second network node. In accordance with an exemplary embodiment, the second network node may comprise a SCS, an AS, and/or a network node with an AF. Optionally, the second network node may be implemented as a SCS, an AS, an AF, or any other suitable network function or entity which may be able to configure or provision PFD information to a first network node such as a PFDF, a NEF (PFDF), etc.

According to the exemplary method 500 illustrated in FIG. 5, the second network node can determine PFD information for traffic detection, as shown in block 502. The PFD information may indicate a combination criterion/condition for two or more PFDs (e.g., indicating to use the two or more PFDs together for the traffic detection), a protocol matching criterion for a domain name in a PFD (e.g., indicating that DNS and/or TLS may be applicable for the domain name), and/or any other parameter/property/attribute suitable for the traffic detection. Optionally, the protocol matching criterion for the domain name may indicate some protocol parameters such as DNS query domain name, TLS client hello SNI, TLS server certificate's SAN, TLS server certificate's SCN, etc.

In accordance with some exemplary embodiments, the second network node may transmit the PFD information to a first network node (such as the first network node as described with respect to FIG. 4), as shown in block 504. The PFD for the traffic detection may be transmitted in a PFD management request (e.g., the request as described in connection with signaling operation 311 in FIG. 3A or signaling operation 321 in FIG. 3B) by the second network node. Optionally, the PFD information for the traffic detection may be transmitted to the first network node via an intermediate network node such as a SCEF.

Figure 6:
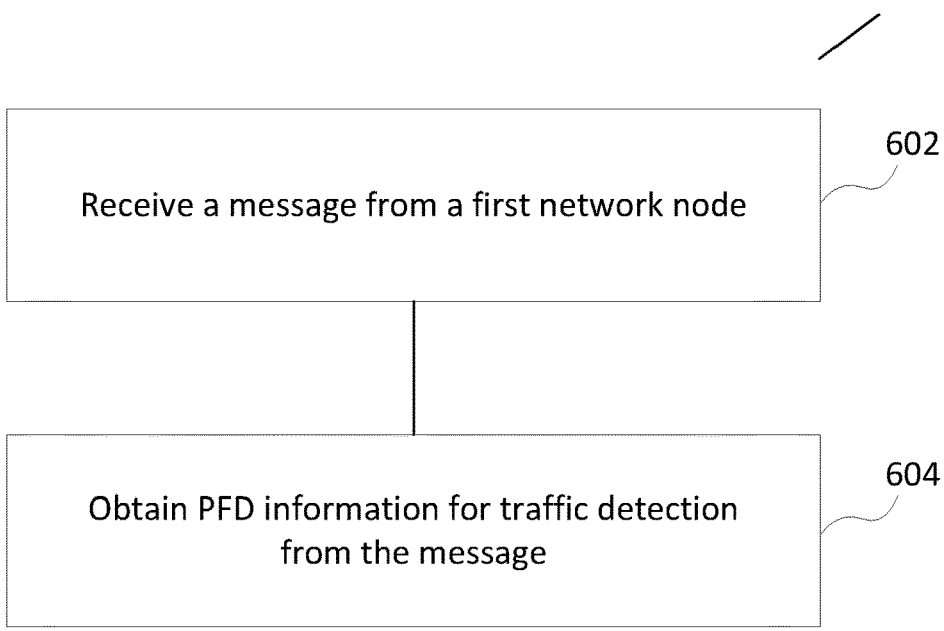
FIG. 6 is a flowchart illustrating yet another method according to some embodiments of the present disclosure.

FIG. 6 is a flowchart illustrating a method 600 according to some embodiments of the present disclosure. The method 600 illustrated in FIG. 6 may be performed by a third network node or an apparatus communicatively coupled to the third network node. In accordance with an exemplary embodiment, the third network node may comprise a network node with PCEF, TDF and/or SMF. Optionally, the third network node may be implemented as a PCEF, a TDF, a SMF or any other suitable network function or entity which may be able to get PFD information from a first network node such as a PFDF, a NEF (PFDF), etc.

According to the exemplary method 600 illustrated in FIG. 6, the third network node may receive a message from a first network node (such as the first network node as described with respect to FIG. 4), as shown in block 602. In accordance with some exemplary embodiments, the message received from the first network node may comprise a PFD provisioning notification, a PFD management notify request, and/or any other message which is suitable for carrying the PFD information pushed to the third network node by the first network node.

Alternatively or additionally, the message received from the first network node may comprise a response to at least one of: a fetch PFD request from the third network node, a PFD management fetch request from the third network node, and any other message which is suitable for carrying the PFD information pulled from the first network node by the third network node.

In accordance with some exemplary embodiments, the third network node can obtain PFD information for traffic detection from the message, as shown in block 604. As described with respect to FIGS. 4-5, the PFD information may indicate a combination criterion for two or more PFDs, a protocol matching criterion for a domain name in a PFD, and/or any other parameter/property/attribute applicable for the traffic detection.

Figure 7:
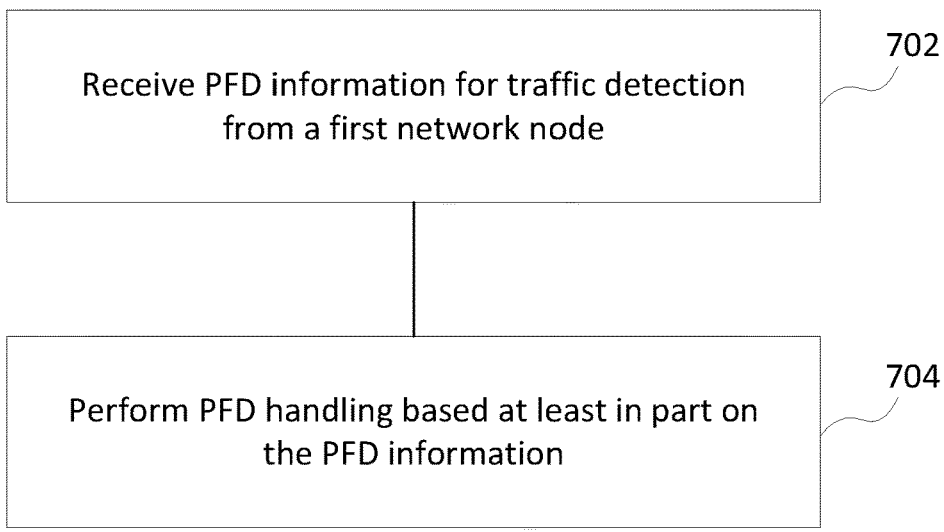
FIG. 7 is a flowchart illustrating a further method according to some embodiments of the present disclosure.

FIG. 7 is a flowchart illustrating a method 700 according to some embodiments of the present disclosure. The method 700 illustrated in FIG. 7 may be performed by a database or an apparatus communicatively coupled to the database. In accordance with an exemplary embodiment, the database may comprise a UDR, or any other suitable network function or entity which may be able to store PFD information obtained from a first network node such as a PFDF, a NEF (PFDF), etc.

According to the exemplary method 700 illustrated in FIG. 7, the database may receive PFD information for traffic detection from a first network node (such as the first network node as described with respect to FIG. 4), as shown in block 702. The PFD information may be received in a data management (DM) create request from the first network node. Alternatively or additionally, the PFD information may be received in a DM update request from the first network node, as described with respect to FIG. 3B.

In accordance with some exemplary embodiments, the database can perform PFD handling based at least in part on the PFD information, as shown in block 704. For example, the database can create and/or update one or more information records according to the received PFD information (such as the PFD information as described in connection with FIGS. 4-6). The PFD information may indicate protocol information (e.g., about DNS, TLS, etc.) for domain names to be matched, and/or the combined PFDs to be used together to detect the expected application traffic.

In accordance with some exemplary embodiments, the database may receive a request for the PFD information from a fourth network node. It can be appreciated that the fourth network node may comprise a network node with a PFDF, which may be different from the first network node. Optionally, the request for the PFD information may comprise a DM query request (such as the Nudr_DM_Query request as described in connection with FIG. 3B) from the fourth network node. A response to the request for the PFD information can be transmitted to the fourth network node by the database. The response may indicate the PFD information requested by the fourth network node.

The proposed solution according to one or more exemplary embodiments can enable the PFD definition to be extended to indicate the matching protocol for the domain name. Alternatively or additionally, the PFD extension according to the exemplary embodiments provides possibility of matching criteria for one or more PFDs to detect an application. Taking advantage of the proposed PFD extension, more accurate traffic detection can be achieved and the application traffic can be handled more properly.

The various blocks shown in FIGS. 4-7 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 8:
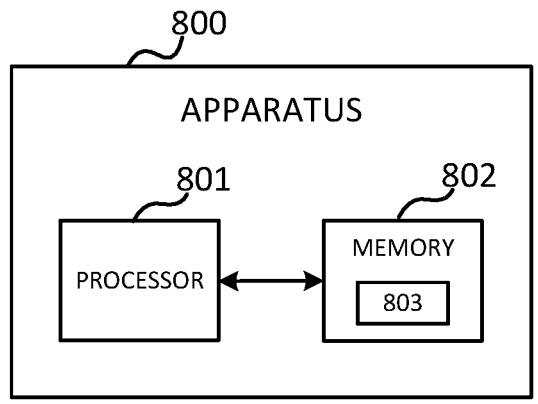
FIG. 8 is a block diagram illustrating an apparatus according to some embodiments of the present disclosure.

FIG. 8 is a block diagram illustrating an apparatus 800 according to various embodiments of the present disclosure. As shown in FIG. 8, the apparatus 800 may comprise one or more processors such as processor 801 and one or more memories such as memory 802 storing computer program codes 803. The memory 802 may be non-transitory machine/processor/computer readable storage medium. In accordance with some exemplary embodiments, the apparatus 800 may be implemented as an integrated circuit chip or module that can be plugged or installed into a first network node as described with respect to FIG. 4, a second network node as described with respect to FIG. 5, a third network node as described with respect to FIG. 6, and a database as described with respect to FIG. 7.

In some implementations, the one or more memories 802 and the computer program codes 803 may be configured to, with the one or more processors 801, cause the apparatus 800 at least to perform any operation of the method as described in connection with FIG. 4. In some implementations, the one or more memories 802 and the computer program codes 803 may be configured to, with the one or more processors 801, cause the apparatus 800 at least to perform any operation of the method as described in connection with FIG. 5. In some implementations, the one or more memories 802 and the computer program codes 803 may be configured to, with the one or more processors 801, cause the apparatus 800 at least to perform any operation of the method as described in connection with FIG. 6. In some implementations, the one or more memories 802 and the computer program codes 803 may be configured to, with the one or more processors 801, cause the apparatus 800 at least to perform any operation of the method as described in connection with FIG. 7.

Alternatively or additionally, the one or more memories 802 and the computer program codes 803 may be configured to, with the one or more processors 801, cause the apparatus 800 at least to perform more or less operations to implement the proposed methods according to the exemplary embodiments of the present disclosure.

Figure 9:
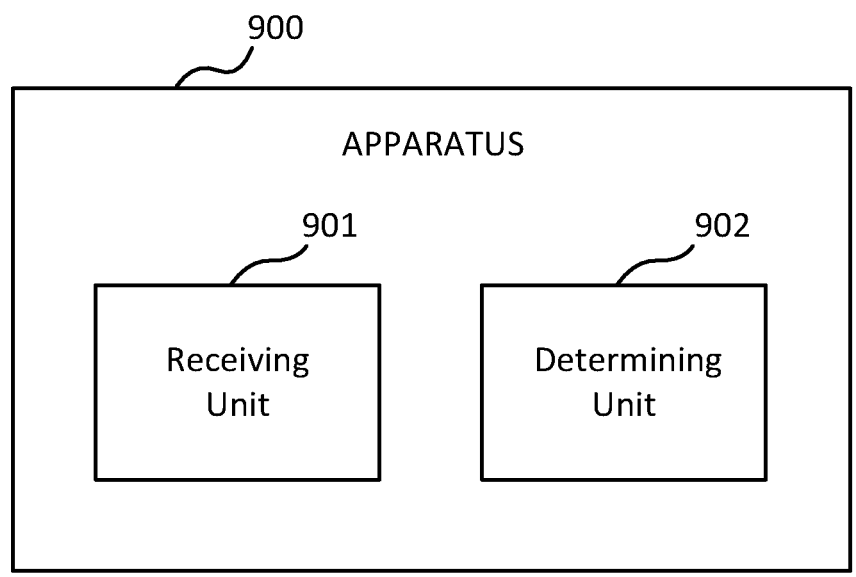
FIG. 9 is a block diagram illustrating another apparatus according to some embodiments of the present disclosure.

FIG. 9 is a block diagram illustrating an apparatus 900 according to some embodiments of the present disclosure. The apparatus 900 may be implemented as a first network node or as a part of the first network node. As shown in FIG. 9, the apparatus 900 may comprise a receiving unit 901 and a determining unit 902. In an exemplary embodiment, the apparatus 900 may be implemented in a first network node such as a PFDF, a NEF (PFDF), etc. The receiving unit 901 may be operable to carry out the operation in block 402, and the determining unit 902 may be operable to carry out the operation in block 404. Optionally, the receiving unit 901 and/or the determining unit 902 may be operable to carry out more or less operations to implement the proposed methods according to the exemplary embodiments of the present disclosure.

Figure 10:
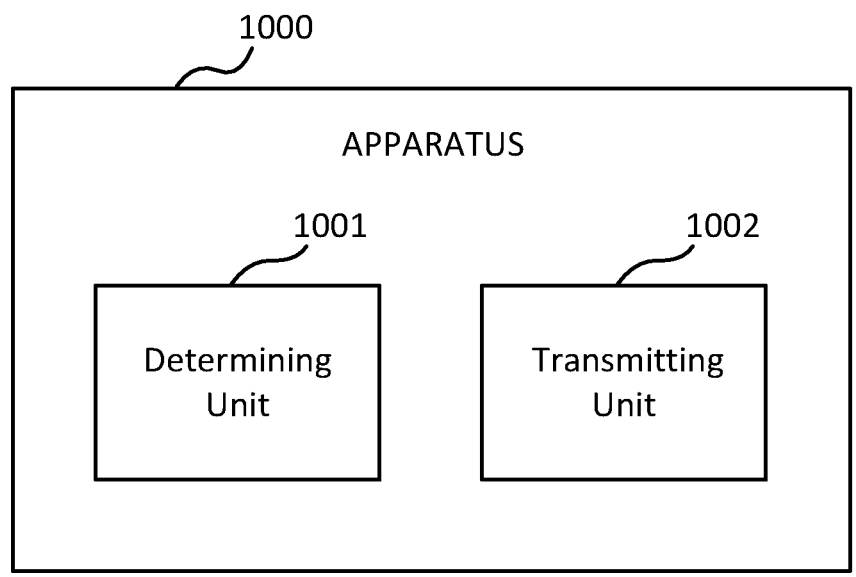
FIG. 10 is a block diagram illustrating yet another apparatus according to some embodiments of the present disclosure.

FIG. 10 is a block diagram illustrating an apparatus 1000 according to some embodiments of the present disclosure. The apparatus 1000 may be implemented as a second network node or as a part of the second network node. As shown in FIG. 10, the apparatus 1000 may comprise a determining unit 1001 and a transmitting unit 1002. In an exemplary embodiment, the apparatus 1000 may be implemented in a second network node such as a SCS, an AS, an AF, etc. The determining unit 1001 may be operable to carry out the operation in block 502, and the transmitting unit 1002 may be operable to carry out the optional operation in block 504. Optionally, the determining unit 1001 and/or the transmitting unit 1002 may be operable to carry out more or less operations to implement the proposed methods according to the exemplary embodiments of the present disclosure.

Figure 11:
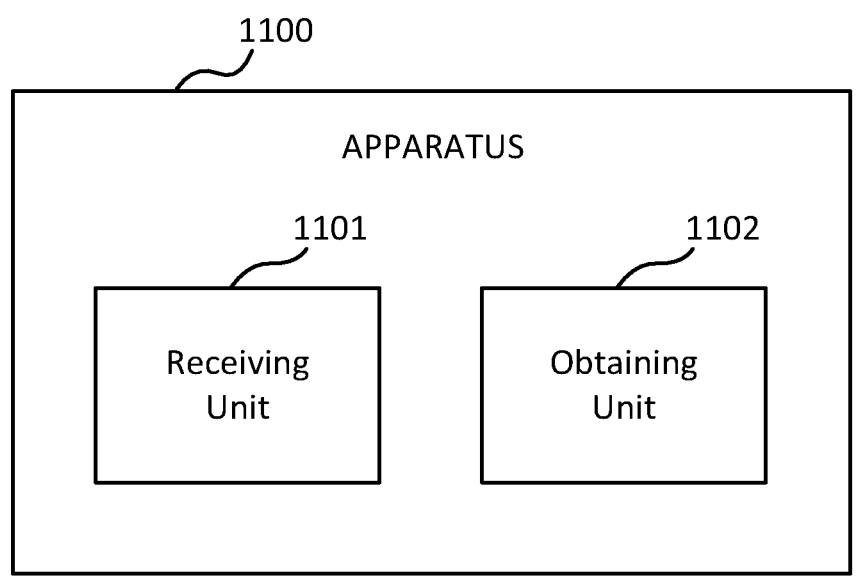
FIG. 11 is a block diagram illustrating yet another apparatus according to some embodiments of the present disclosure.

FIG. 11 is a block diagram illustrating an apparatus 1100 according to some embodiments of the present disclosure. The apparatus 1100 may be implemented as a third network node or as a part of the third network node. As shown in FIG. 11, the apparatus 1100 may comprise a receiving unit 1101 and an obtaining unit 1102. In an exemplary embodiment, the apparatus 1100 may be implemented in a third network node such as a PCEF, a TDF, an SMF, etc. The receiving unit 1101 may be operable to carry out the operation in block 602, and the obtaining unit 1102 may be operable to carry out the operation in block 604. Optionally, the receiving unit 1101 and/or the obtaining unit 1102 may be operable to carry out more or less operations to implement the proposed methods according to the exemplary embodiments of the present disclosure.

Figure 12:
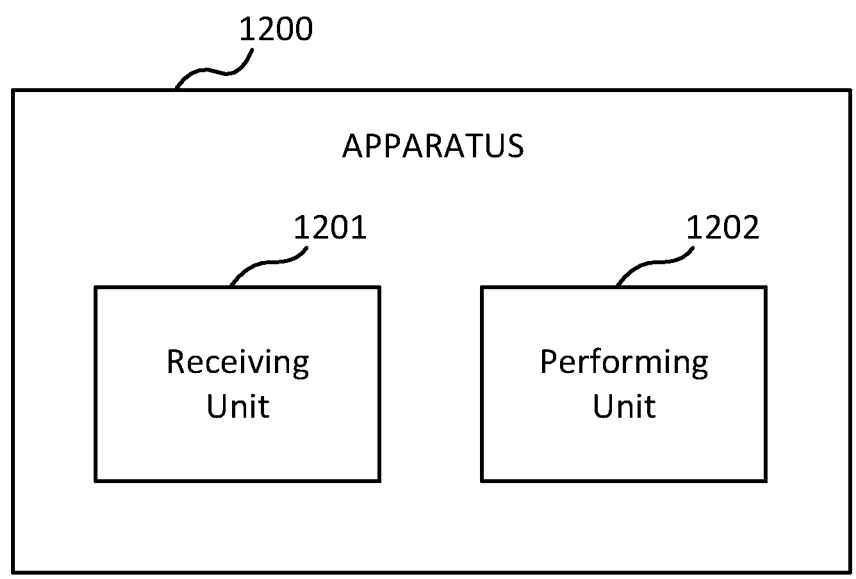
FIG. 12 is a block diagram illustrating a further apparatus according to some embodiments of the present disclosure.

FIG. 12 is a block diagram illustrating an apparatus 1200 according to some embodiments of the present disclosure. The apparatus 1200 may be implemented as a database or as a part of the database. As shown in FIG. 12, the apparatus 1200 may comprise a receiving unit 1201 and a performing unit 1202. In an exemplary embodiment, the apparatus 1200 may be implemented in a database such as a UDR, etc. The receiving unit 1201 may be operable to carry out the operation in block 702, and the performing unit 1202 may be operable to carry out the operation in block 704. Optionally, the receiving unit 1201 and/or the performing unit 1202 may be operable to carry out more or less operations to implement the proposed methods according to the exemplary embodiments of the present disclosure.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method performed by a first network node, comprising:
  receiving a message from a second network node; and
  determining packet flow description information for traffic detection according to the message, the packet flow description information indicating:
    a combination criterion for two or more packet flow descriptions; and
    a protocol matching criterion for a domain name in a packet flow description.

2. The method according to claim 1, wherein the combination criterion for the two or more packet flow descriptions indicates that the two or more packet flow descriptions are used together for the traffic detection.

3. The method according to claim 1, wherein the protocol matching criterion for the domain name indicates one or more protocols applicable for the domain name, and wherein the one or more protocols comprise at least one of:

a domain name system protocol; and
a transport layer security protocol; and
wherein the protocol matching criterion for the domain name indicates one or more protocol parameters which identify at least one of:
a query name in a protocol message;
a server name in a protocol message;
a subject alternative name in a protocol message; and
a subject common name in a protocol message.

4. The method according to claim 1, wherein at least one of:
the first network node comprises a network node with a packet flow description function; and
the second network node comprises one of a service capability server, an application server, and a network node with an application function.

5. The method according to claim 1, wherein the message from the second network node comprises a packet flow description management request.

6. The method according to claim 1, wherein the message from the second network node is received by the first network node via an intermediate network node with a service capability exposure function.

7. The method according to claim 1, further comprising:
notifying a third network node of the packet flow description information; and
wherein the third network node comprises a network node having at least one of the following:
a policy and charging enforcement function;
a traffic detection function; and
a session management function.

8. The method according to claim 1, further comprising:
receiving a first request for packet flow description information from a third network node; and
transmitting a response to the first request to the third network node, wherein the response indicates the packet flow description information which is determined by the first network node according to the message from the second network node.

9. The method according to claim 1, further comprising:
updating information in a database by using the packet flow description information; and
wherein the database comprises a user data repository.

10. The method according to claim 1, further comprising:
receiving a second request for packet flow description information from a third network node;
querying a database for the requested packet flow description information;
obtaining the requested packet flow description information from the database; and
transmitting a response to the second request to the third network node, wherein the response indicates the packet flow description information obtained from the database.

11. A method performed by a second network node, the method comprising:
determining packet flow description information for traffic detection; and
transmitting the packet flow description information to a first network node, the packet flow description information indicating:
a combination criterion for two or more packet flow descriptions; and
a protocol matching criterion for a domain name in a packet flow description.

12. The method according to claim 11, wherein the combination criterion for the two or more packet flow descriptions indicates that the two or more packet flow descriptions are used together for the traffic detection.

13. The method according to claim 11, wherein the protocol matching criterion for the domain name indicates one or more protocols applicable for the domain name, and wherein the one or more protocols comprise at least one of:
a domain name system protocol; and
a transport layer security protocol; and
wherein the protocol matching criterion for the domain name indicates one or more protocol parameters which identify at least one of:
a query name in a protocol message;
a server name in a protocol message;
a subject alternative name in a protocol message; and
a subject common name in a protocol message.

14. The method according to claim 11, wherein at least one of:
the first network node comprises a network node with a packet flow description function; and
the second network node comprises one of: a service capability server, an application server, and a network node with an application function.

15. The method according to claim 11, wherein the packet flow description information for the traffic detection is transmitted in a packet flow description management request by the second network node; and
wherein the packet flow description information for the traffic detection is transmitted to the first network node via an intermediate network node with a service capability exposure function.

16. A method performed by a third network node, the method comprising:
receiving a message from a first network node; and
obtaining packet flow description information for traffic detection from the message, the packet flow description information indicating:
a combination criterion for two or more packet flow descriptions; and
a protocol matching criterion for a domain name in a packet flow description.

17. The method according to claim 16, wherein the combination criterion for the two or more packet flow descriptions indicates that the two or more packet flow descriptions are used together for the traffic detection.

18. The method according to claim 16, wherein the protocol matching criterion for the domain name indicates one or more protocols applicable for the domain name, and wherein the one or more protocols comprise at least one of:
a domain name system protocol; and
a transport layer security protocol; and
wherein the protocol matching criterion for the domain name indicates one or more protocol parameters which identify at least one of:
a query name in a protocol message;
a server name in a protocol message;
a subject alternative name in a protocol message; and
a subject common name in a protocol message.

19. The method according to claim 16, wherein at least one of:
the first network node comprises a network node with a packet flow description function; and
the third network node comprises a network node having at least one of the following:
a policy and charging enforcement function;
a traffic detection function; and
a session management function.

20. The method according to claim 16, wherein the message received from the first network node comprises at least one of:
- a packet flow description provisioning notification; and
- a packet flow description management notify request.

21. The method according to claim 16, wherein the message received from the first network node comprises a response to at least one of:
- a fetch packet flow description request from the third network node; and
- a packet flow description management fetch request from the third network node.

22. A first network node, comprising:
- one or more processors; and
- one or more memories comprising computer program codes, the one or more memories and the computer program codes configured to, with the one or more processors, cause the first network node at least to perform:
- receiving a message from a second network node; and
- determining packet flow description information for traffic detection according to the message, the packet flow description information indicating:
  - a combination criterion for two or more packet flow descriptions; and
  - a protocol matching criterion for a domain name in a packet flow description.

23. A second network node, comprising:
- one or more processors; and
- one or more memories comprising computer program codes, the one or more memories and the computer program codes configured to, with the one or more processors, cause the second network node at least to perform:
- determining packet flow description information for traffic detection; and
- transmitting the packet flow description information to a first network node, the packet flow description information indicating:
  - a combination criterion for two or more packet flow descriptions; and
  - a protocol matching criterion for a domain name in a packet flow description.

24. A third network node, comprising:
- one or more processors; and
- one or more memories comprising computer program codes, the one or more memories and the computer program codes configured to, with the one or more processors, cause the third network node at least to perform:
- receiving a message from a first network node; and
- obtaining packet flow description information for traffic detection from the message, the packet flow description information indicating:
  - a combination criterion for two or more packet flow descriptions; and
  - a protocol matching criterion for a domain name in a packet flow description.

* * * * *

UNITED STATES PATENT AND TRADEMARK OFFICE
CERTIFICATE OF CORRECTION

PATENT NO. : 11,750,523 B2
APPLICATION NO. : 17/430464
DATED : September 5, 2023
INVENTOR(S) : Xu et al.

It is certified that error appears in the above-identified patent and that said Letters Patent is hereby corrected as shown below:

On the Title Page

On Page 2, in Item (56), under "OTHER PUBLICATIONS", in Column 2, Line 34, delete "c3GPP" and insert -- 3GPP --, therefor.

In the Drawings

In Fig. 2B, Sheet 3 of 11, for Tag "221.", in Line 1, delete "Subsribe" and insert -- Subscribe --, therefor.

In Fig. 2B, Sheet 3 of 11, for Tag "222.", in Line 1, delete "Subsribe" and insert -- Subscribe --, therefor.

In Fig. 2B, Sheet 3 of 11, for Tag "225.", in Line 1, delete "Unsubsribe" and insert -- Unsubscribe --, therefor.

In Fig. 2B, Sheet 3 of 11, for Tag "226.", in Line 1, delete "Unsubsribe" and insert -- Unsubscribe --, therefor.

In the Specification

In Column 11, Line 33, delete "SGC." and insert -- 5GC. --, therefor.

Signed and Sealed this
Ninth Day of July, 2024

Katherine Kelly Vidal
*Director of the United States Patent and Trademark Office*